(12) United States Patent
Knipp et al.

(10) Patent No.: US 11,250,630 B2
(45) Date of Patent: Feb. 15, 2022

(54) IMMERSIVE STORY CREATION

(71) Applicant: HALLMARK CARDS, INCORPORATED, Kansas City, MO (US)

(72) Inventors: Randy S. Knipp, Kansas City, MO (US); Kevin M. Brooks; Stephen Richard Eikos, Lenexa, KS (US); Jason Blake Penrod, Shawnee, KS (US); Jeffrey Alan Jones, Lee's Summit, MO (US); Tim P. Patch, Brooklyn, NY (US); Timothy J. Lien, Lenexa, KS (US)

(73) Assignee: HALLMARK CARDS, INCORPORATED, Kansas City, MO (US)

( * ) Notice: Subject to any disclaimer, the term of this patent is extended or adjusted under 35 U.S.C. 154(b) by 0 days.

(21) Appl. No.: 14/942,815

(22) Filed: Nov. 16, 2015

(65) Prior Publication Data
US 2016/0225187 A1    Aug. 4, 2016

Related U.S. Application Data

(60) Provisional application No. 62/081,336, filed on Nov. 18, 2014.

(51) Int. Cl.
*G06T 19/00* (2011.01)
*H04N 9/31* (2006.01)
(Continued)

(52) U.S. Cl.
CPC .......... *G06T 19/006* (2013.01); *G06F 40/117* (2020.01); *G06F 40/131* (2020.01);
(Continued)

(58) Field of Classification Search
CPC combination set(s) only.
See application file for complete search history.

(56) References Cited

U.S. PATENT DOCUMENTS 5,805,784 A    9/1998   Crawford
5,855,483 A    1/1999   Collins et al.
(Continued)

OTHER PUBLICATIONS

Bobick et al., The KidsRoom: A Perceptually-Based Interactive and Immersive Story Environment; MIT Media Laboratory Perceptual Computing Sections Technical Report, No. 398, Nov. 1996, pp. 1-20.*

(Continued)

*Primary Examiner* — Motilewa Good Johnson
(74) *Attorney, Agent, or Firm* — Shook, Hardy & Bacon LLP

(57) ABSTRACT

Immersive, dynamic storytelling functionality is described. The stories may include elements (e.g., characters, settings, duration, etc.) based on information provided, including in real time, by the user or presentation environment, and may be presented by projecting visual or audio story elements into the space surrounding the user. For example, as a child tells a story about a jungle, the room is filled with images of foliage. Animals that live in the jungle may be suggested as characters. Stories may be contextually tailored based on information about the user, environment, storytelling conditions, or other context. For example, story duration and excitement level may be influenced by the time of day, such that a story presented ten minutes before bedtime is an appropriate duration and excitement level. In some cases, objects of the presentation environment are incorporated into the story, such as a character projected as though entering through an actual doorway.

18 Claims, 25 Drawing Sheets

(51) Int. Cl.
  *G06F 40/30* (2020.01)
  *G06F 40/117* (2020.01)
  *G06F 40/131* (2020.01)
  *G03B 21/00* (2006.01)

(52) U.S. Cl.
  CPC ............ *G06F 40/30* (2020.01); *H04N 9/3185* (2013.01); *H04N 9/3194* (2013.01); *G03B 21/00* (2013.01)

(56) References Cited

U.S. PATENT DOCUMENTS

| | | | |
|---|---|---|---|
| 6,425,764 | B1 | 7/2002 | Lamson |
| 7,155,158 | B1 | 12/2006 | Iuppa et al. |
| 7,309,283 | B2 | 12/2007 | Nemitz |
| 7,333,967 | B1 | 2/2008 | Bringsjord et al. |
| 7,437,683 | B1 | 10/2008 | Beezer et al. |
| 7,685,163 | B2 | 3/2010 | Chaudhri |
| 7,890,336 | B2 | 2/2011 | Birnbaum et al. |
| 7,890,534 | B2 | 2/2011 | Bathiche et al. |
| 8,032,480 | B2 | 10/2011 | Pinckney et al. |
| 8,177,639 | B2 | 5/2012 | Schell |
| 8,202,161 | B2 | 6/2012 | Leake et al. |
| 8,277,221 | B2 | 10/2012 | Damron et al. |
| 8,287,382 | B2 | 10/2012 | Holloway et al. |
| 8,332,251 | B1 | 12/2012 | Morris et al. |
| 8,374,848 | B1 | 2/2013 | Birnbaum et al. |
| 8,381,108 | B2 | 2/2013 | Fuller et al. |
| 8,422,852 | B2 | 4/2013 | Suri et al. |
| 8,478,645 | B2 | 7/2013 | Russek |
| 8,491,389 | B2 | 7/2013 | Weston et al. |
| 8,510,656 | B2 * | 8/2013 | Schwarz ............... G09B 5/062 715/716 |
| 8,555,170 | B2 | 10/2013 | Rodriguez |
| 8,566,348 | B2 | 10/2013 | Rinearson et al. |
| 8,613,646 | B2 | 12/2013 | Rogers |
| 8,656,043 | B1 | 2/2014 | Wieder |
| 8,688,434 | B1 | 4/2014 | Birnbaum et al. |
| 8,694,896 | B2 | 4/2014 | Edwards et al. |
| 9,274,747 | B2 * | 3/2016 | Fuller .................... G06F 3/017 |
| 2003/0002168 | A1 | 1/2003 | Richfield |
| 2004/0009813 | A1 | 1/2004 | Wind |
| 2005/0120389 | A1 * | 6/2005 | Boss ..................... G06Q 30/02 725/135 |
| 2005/0268279 | A1 | 12/2005 | Paulsen et al. |
| 2006/0253783 | A1 | 11/2006 | Vronay et al. |
| 2007/0099684 | A1 * | 5/2007 | Butterworth ......... G11B 27/034 463/1 |
| 2007/0204211 | A1 * | 8/2007 | Paxson ................. G06F 40/131 715/205 |
| 2007/0281285 | A1 | 12/2007 | Jayaweera |
| 2008/0267450 | A1 | 10/2008 | Sugimoto et al. |
| 2008/0301082 | A1 * | 12/2008 | Talbot ................... G06N 7/005 706/50 |
| 2008/0304808 | A1 | 12/2008 | Newell et al. |
| 2008/0320126 | A1 * | 12/2008 | Drucker ................ G06Q 30/00 709/224 |
| 2009/0029771 | A1 * | 1/2009 | Donahue ............... A63F 13/10 463/31 |
| 2009/0246749 | A1 * | 10/2009 | Thursfield ............ G09B 5/062 434/310 |
| 2009/0327898 | A1 * | 12/2009 | Kim .................... G11B 27/034 715/731 |
| 2010/0092930 | A1 | 4/2010 | Fletcher et al. |
| 2010/0110081 | A1 * | 5/2010 | Arora ................... G06T 13/00 345/473 |
| 2011/0093560 | A1 * | 4/2011 | Morris ................. H04L 67/02 709/217 |
| 2011/0107217 | A1 * | 5/2011 | Schwarz ............... G09B 5/062 715/716 |
| 2011/0169832 | A1 | 7/2011 | Brown et al. |
| 2011/0314381 | A1 * | 12/2011 | Fuller ................... G06F 3/017 715/727 |
| 2012/0094768 | A1 * | 4/2012 | McCaddon .......... G06F 3/0482 463/42 |
| 2012/0122066 | A1 | 5/2012 | Dohring et al. |
| 2012/0122570 | A1 | 5/2012 | Baronoff |
| 2012/0190446 | A1 * | 7/2012 | Rogers .................... A63F 13/47 463/31 |
| 2012/0190456 | A1 | 7/2012 | Rogers |
| 2012/0194517 | A1 | 8/2012 | Izadi et al. |
| 2012/0197992 | A1 | 8/2012 | Meyer et al. |
| 2012/0236201 | A1 | 9/2012 | Larsen et al. |
| 2012/0246562 | A1 | 9/2012 | Maness et al. |
| 2012/0254255 | A1 | 10/2012 | Jeong et al. |
| 2012/0264510 | A1 | 10/2012 | Wigdor et al. |
| 2013/0036371 | A1 | 2/2013 | Cohen |
| 2013/0091436 | A1 * | 4/2013 | Rose ................... G06F 3/04817 715/747 |
| 2013/0104072 | A1 * | 4/2013 | Havard ................ G06F 3/048 715/781 |
| 2013/0117377 | A1 | 5/2013 | Miller |
| 2013/0145240 | A1 * | 6/2013 | Anderson ............. G06F 3/0483 715/201 |
| 2013/0195429 | A1 | 8/2013 | Fay et al. |
| 2013/0201185 | A1 * | 8/2013 | Kochi .................... G06F 3/011 345/419 |
| 2013/0262092 | A1 * | 10/2013 | Wasick ................ G06F 40/56 704/9 |
| 2013/0286004 | A1 | 10/2013 | McCulloch et al. |
| 2013/0290871 | A1 | 10/2013 | Jordan et al. |
| 2013/0303285 | A1 | 11/2013 | Kochi et al. |
| 2013/0307855 | A1 | 11/2013 | Lamb et al. |
| 2013/0328927 | A1 | 12/2013 | Mount et al. |
| 2014/0019893 | A1 | 1/2014 | Gudmundsson et al. |
| 2014/0028713 | A1 | 1/2014 | Keating et al. |
| 2014/0031060 | A1 | 1/2014 | Bensley et al. |
| 2014/0034724 | A1 | 2/2014 | Raichman et al. |
| 2014/0080109 | A1 | 3/2014 | Haseltine et al. |
| 2014/0195222 | A1 | 7/2014 | Peevers ............... G10L 21/003 704/201 |
| 2014/0327610 | A1 * | 11/2014 | Athavale ............. G06F 3/011 345/156 |
| 2015/0026785 | A1 * | 1/2015 | Soon-Shiong ..... G06Q 30/0207 726/7 |
| 2015/0142434 | A1 * | 5/2015 | Wittich ................ G10L 21/10 704/235 |
| 2015/0375115 | A1 * | 12/2015 | Bunting ................ A63F 13/47 463/29 |
| 2016/0063875 | A1 * | 3/2016 | Javidan ................ G09B 5/062 434/317 |
| 2016/0063876 | A1 * | 3/2016 | Javidan ................ G09B 5/062 434/317 |
| 2017/0053541 | A1 * | 2/2017 | Tsyrina ................ G06F 3/167 |

OTHER PUBLICATIONS

Cavazza, Madame Bovary on the Holodeck: Immersive Interactive Storytelling, Proceeding of the 15th ACM international conference on Multimedia, Sep. 29, 2007, pp. 651-660.*
Sherman et al., StoryKit: Tools for children to build room-sized interactive experiences, University of Marland, ACM CHI Mar. 2001, pp. 197-198.*
Hayden et al., Narratarium: An Immersive Storytelling Environment, Jul. 21-25, 2013, HCI International 2013 Posters' Extended Abstracts, pp. 536-540 (Year: 2013).*
Magerko, Brian, "Story Representation and Interactive Drama", 2005, Available at: http://lmc.gatech.edu/~bmagerko6/papers/AIIDE05MagerkoB.pdf.
Göbel et al. 80Days: Adaptive Digital Storytelling for Digital Educational Games, 2009, Available at: http://www.researchgate.net/publication/228620091_80days_Adaptive_digital_storytelling_for_digital_educational_games.
Pinhanez et al., Physically interactive story environments, IBM Systems Journal 39.3/4 (2000), pp. 438-455.
Nandi et al., Interactive Immersive Transfiction, 2002. Available at: http://www.researchgate.net/publication/221594625_Interactive_Immersive_Transfiction/file/d912f50c07b20e536e.pdf.

(56) References Cited

OTHER PUBLICATIONS

Gobel et al., StoryTec: A Digital Storytelling Platform for the Authoring and Experiencing of Interactive and Non-Linear Stories, Dec. 31, 2008, Available at: http://ieeexplore.ieee.org/xpl/login.jsp?tp=&arnumber=4688056&url=http%3A%2F%2Fieeexplore.ieee.org%2Fxpls%2Fabs_all.jsp%3Farnumber%3D4688056.

Cooper et al., Dynamic Interactive Storytelling for Computer Games Using AI Techniques, 2010. Retrieved from the Internet on Apr. 9, 2014: http://www.cms.livjm.ac.uk/pgnet2010/MakeCD/Papers/2010012.pdf.

Theune et al.,The Virtual Storyteller: story creation by intelligent agents Retrieved from the Internet on Apr. 10, 2014: http://wwwhome.cs.utwente.nl/~theune/PUBS/CVE.pdf.

Katre, D.S., "Systematic Modeling of Stories and Role Development of Storyteller for Interactive Multimedia", Proc. Int. Conf. on Storytelling in the Digital Age, National Institute of Design & Media Lab Asia, Ahmedabad, India, 2002.

Riedl et al., Believable Agents and Intelligent Story Adaptation for Interactive Storytelling, 2006. http://speciale.barmonger.org/Referencer/Believable%20Agents%20and%20Intelligent%20Story%20Adaptation%20for%20Interactive%20Storytelling.pdf.

Spierling et al., Setting the scene: playing digital director in interactive storytelling and creation, Computers & Graphics vol. 26, Issue 1, Feb. 2002, pp. 31-44.

Ryokai et al., Virtual peers as partners in storytelling and literacy learning, 2003. Journal of Computer Assisted Learning (2003) 19, 195-208.

Mulholland et al., Story Fountain: Intelligent support for story research and exploration, 2004. http://citeseerx.ist.psu.edu/viewdoc/summary?doi=10.1.1.2.5640.

Office Action dated Dec. 20, 2017 in Canadian Patent Application No. 2,912,243, 6 pages.

Notice of Allowance dated Jan. 9, 2019 in Canadian Patent Application No. 2,912,243, 1 page.

Peng, T., "Narratarium: Real-Time Context-Based Sound and Color Extraction from Text", Thesis: M. Eng., Massachusetts Institute of Technology, Department of Electrical Engineering and Computer Science, Retrieved from Internet URL: https://dspace. mit.edu/bitstream/handle/1721. 1/85469/870969861-MIT. pdf?, Retrieved on Aug. 9, 2020, pp. 1-69 (2013).

Office Action received for Canadian Patent Application No. 3048787, dated May 20, 2020, 8 pages.

Notice of Allowance received for Canadian Patent Application No. 3,048,787, dated Dec. 8, 2020, 1 page.

\* cited by examiner

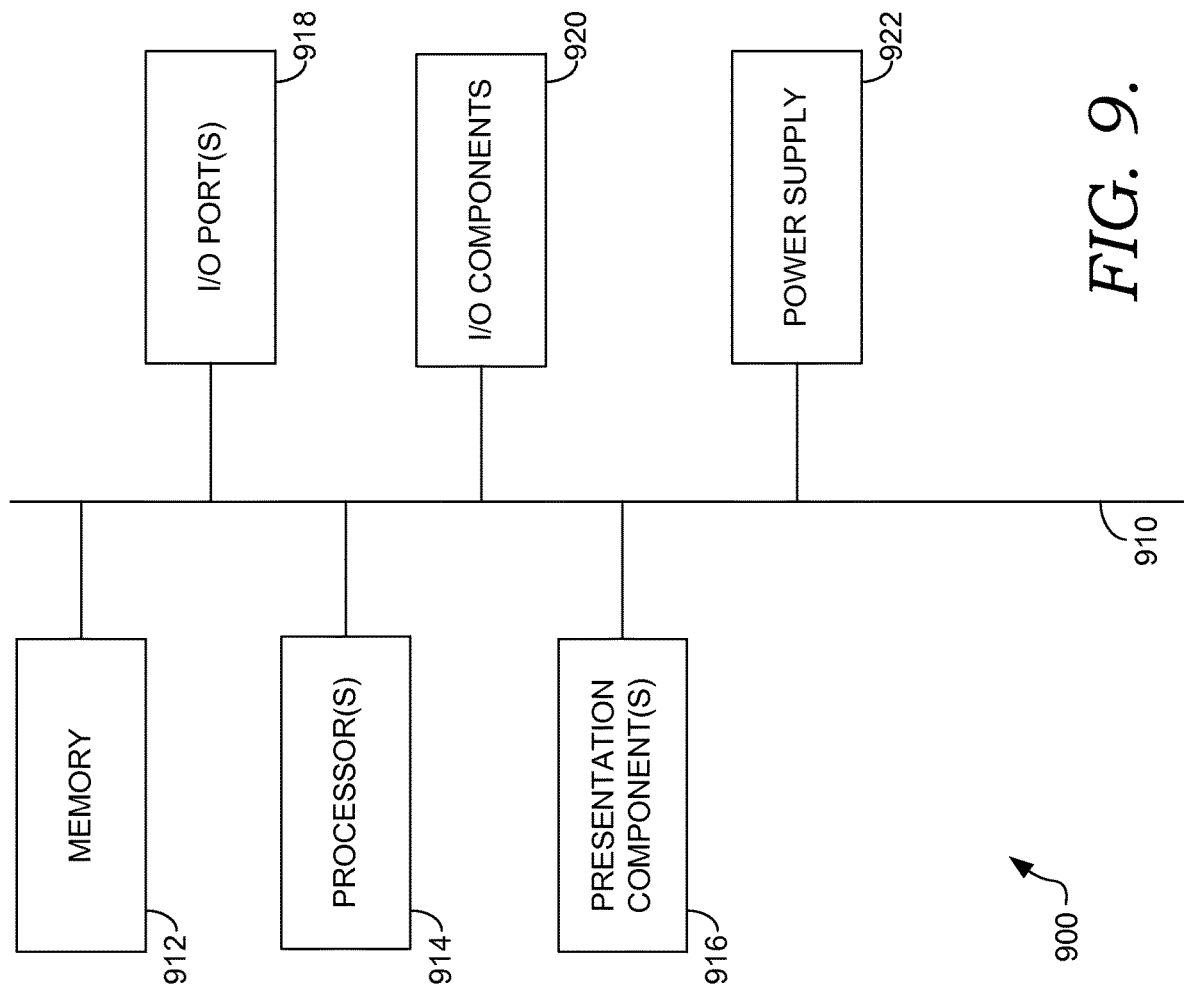

IMMERSIVE STORY CREATION

CROSS-REFERENCE TO RELATED APPLICATIONS

This application claims the benefits of U.S. Provisional Application No. 62/081,336, titled "Immersive Story Creation," filed Nov. 18, 2014, which is hereby expressly incorporated by reference in its entirety.

SUMMARY

Embodiments of the invention are defined by the claims below, not this summary. A high-level overview of various aspects of the invention are provided here for that reason, to provide an overview of the disclosure, and to introduce a selection of concepts that are further described in the detailed description section below. This summary is not intended to identify key features or essential features of the claimed subject matter, nor is it intended to be used as an aid in isolation to determine the scope of the claimed subject matter.

In brief and at a high level, this disclosure describes, among other things, systems and methods for providing immersive storytelling through technologies referred to herein as the Narratarium. In various embodiments, the Narratarium comprises aspects of a platform, which includes hardware components, software components, and related services and applications directed to providing an immersive, dynamic story experience for a user. For example, one embodiment of the Narratarium immerses a user (or users, audience, or the like) into the story by projecting visual and/or audio story elements into the space surrounding the audience.

The story experience provided by some embodiments of the Narratarium may include story elements (such as plotlines, characters, settings, themes, duration, or other aspects of a story) based on information provided by the user and/or the environment, including information provided in real time, as well as information derived from printed stories, audio recordings, toys, or other sources. For example, as a child tells a story about a jungle, the child's room is filled with greens and browns and foliage comes into view. Animals that live in the jungle may be introduced or suggested as characters to the story. Similarly, as a parent tells a story to a child (including a parent, grandparent, or other person(s) telling the story from a remote location), the room is filled with images, colors, sounds, and presence, based on the story. Narratarium further determines other story elements consistent with the provided information, such as appropriate settings or characters.

In some embodiments, the storytelling experience provided by the Narratarium is contextually tailored to the user and/or the user's environment, based on, for example, user history or preferences, information about the presentation environment, storytelling conditions, or other contextual input. For example, the time of day may determine story length and level of excitement such that a story presented 10 minutes before a user's bedtime is made an appropriate length and winds down the excitement level so as to prepare a child for bed. Further, elements of the presentation environment may be incorporated into the story experience. For example, a character in the story may be projected as though entering or exiting through an actual doorway.

BRIEF DESCRIPTION OF THE DRAWINGS

Illustrative embodiments of the invention are described in detail below with reference to the attached drawing figures, and wherein:

FIG. 9 is a block diagram of an exemplary computing environment suitable for implementing embodiments of the invention.

DETAILED DESCRIPTION OF THE INVENTION

Figure 1A:
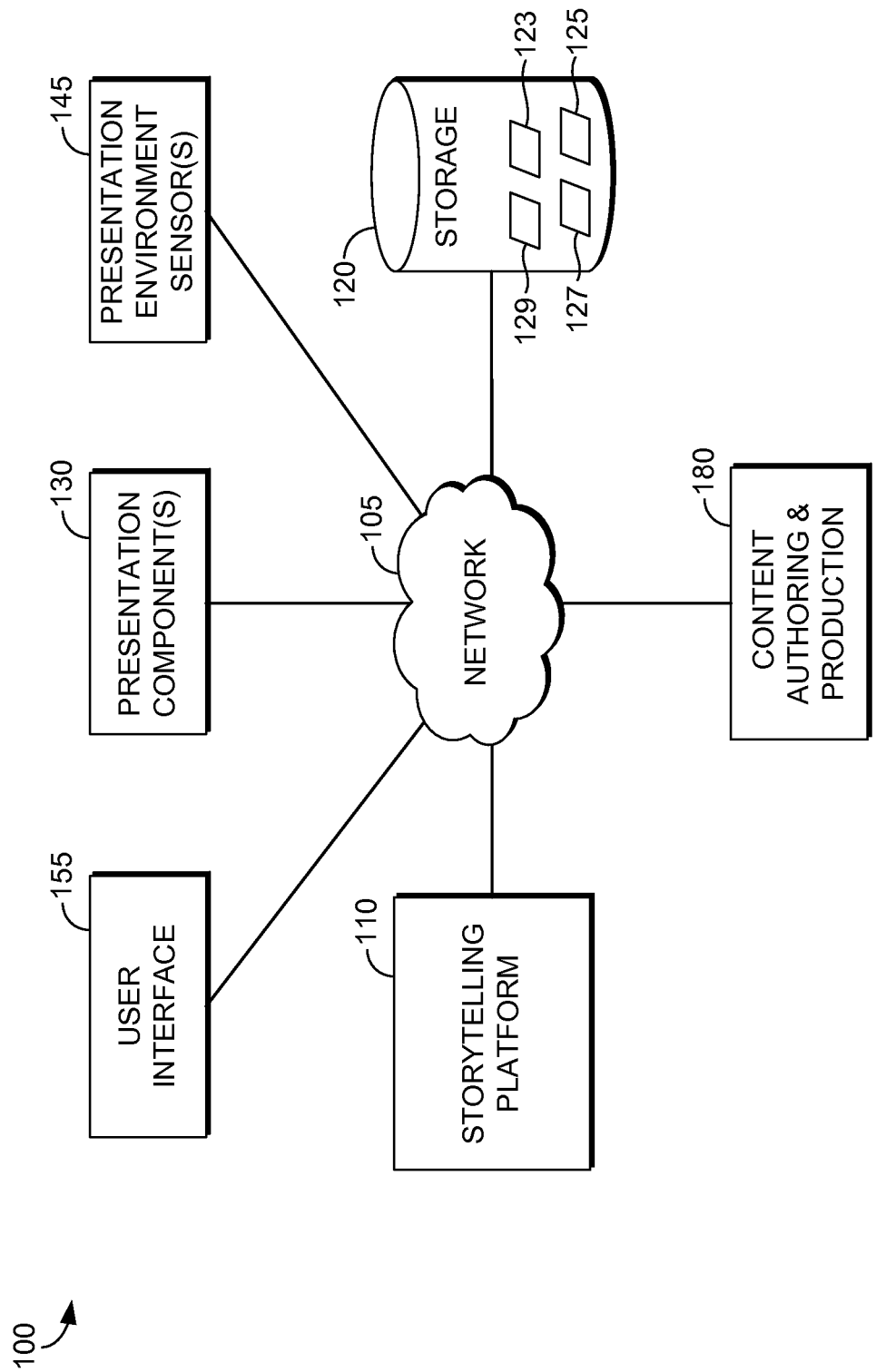
FIGS. 1A, 1B, and 1C depict block diagrams of an example system architecture in which an embodiment of the invention may be employed.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described.

As one skilled in the art will appreciate, embodiments of the invention may be embodied as, among other things: a method, system, or set of instructions embodied on one or more computer-readable media. Accordingly, the embodiments may take the form of a hardware embodiment, a software embodiment, or an embodiment combining software and hardware. In one embodiment, the invention takes the form of a computer-program product that includes computer-usable instructions embodied on one or more computer-readable media.

Various aspects of the technology described herein are generally directed to, among other things, systems, methods, and computer-readable media for providing aspects of immersive storytelling through technologies referred to herein as Narratarium. In various embodiments, the Narratarium comprises a platform or aspects of a platform that includes hardware components, software components, or related services and applications (including apps) directed to providing an immersive, dynamic story experience. In particular, in one aspect, the Narratarium immerses a user (or audience) in a story by projecting visual and audio story elements into the space surrounding the audience.

At a high level, embodiments of the Narratarium are designed to augment storytelling and creative play of the user, which might include a child or a parent. The story experience provided by some embodiments of Narratarium may include story elements (such as plotlines, characters, settings, themes, duration, or other aspects of a story) based on information provided by the user and/or the environment, including information provided in real time, as well as information derived from printed stories, audio recordings, toys, or other sources. Thus, some embodiments of the Narratarium may be considered to be context aware. For example, as a child tells a story about a jungle, the child's room is filled with greens and browns and foliage comes into view. Animals that live in the jungle may be introduced or suggested as characters to the story. Similarly, as a parent tells a story to a child (including a parent, grandparent, or other person(s) telling the story from a remote location), the room is filled with images, colors, sounds, and presence, based on the story. Narratarium further determines other story elements consistent with the provided information, such as appropriate settings or characters; for example, a penguin might appear in an arctic setting but not in a desert setting.

Some embodiments of Narratarium include functionality for providing immersive storytelling experiences based on books, printed stories, or audio recordings. For example, in one embodiment, text-matching is employed to recognize a specific known story text or scene and provide corresponding imagery and sounds. Similarly, one embodiment of Narratarium employs natural language processing (sometimes referred to herein as automatic speech recognition) to interpret stories told by a user or to convert spoken words, such as those read from a book, into text. Alternatively, a user may scan or otherwise provide a reference code on a book (or other product) compatible with an embodiment of Narratarium, or an e-book reader may report information about a book and page to an embodiment of Narratarium. In this way, such an embodiment can present content related to the particular book or even the page, wherein the content may be provided by the publisher.

Other environmental information may also be used by some embodiments of Narratarium for determining story elements. For example, toys or objects in the room may be incorporated into a story. In some cases, the toys or objects may communicate with an embodiment of Narratarium or otherwise be detected, such as via optical or sensor recognition. Sensors, which may be on a presentation component, user device (e.g., mobile phone or tablet) running an app associated with an embodiment of Narratarium, or worn by the user, may detect information about movement or activity level, which can affect the story. For example, a story might involve the user exercising, dancing, or reaching out to touch or interact with a projected character. Other cues and objects in the presentation environment, such as doorways, windows, and furniture, may also be incorporated into a story experience; for example, a character's appearance and sound may be projected as though entering through an actual doorway to the room or flying through an actual window of the room.

In some embodiments, the storytelling experience provided by the Narratarium is contextually tailored to the user and/or the user's environment, based on, for example, user history or preferences, information about the presentation environment, storytelling conditions or other contextual input. For example, the time of day may determine story length and level of excitement such that a story presented 10 minutes before a user's bedtime is made an appropriate length and winds down the excitement level so as to prepare a child for bed. On the other hand, a story presented in the middle of a rainy Saturday afternoon might be longer and contain a higher level of excitement. User history information, such as a child's favorite characters, plotlines, and settings, or story elements that have not been used recently (e.g., something new and untried) may be used by an embodiment to provide an enhanced story experience.

The story experience provided by embodiments of Narratarium are dynamic because the story elements included in a presented story may be modified based on user and/or contextual input, including information provided in real time. In particular, rather than a single, linear story line, some embodiments of Narratarium include sets of related story lines or threads, associated characters, settings, and other story elements, which may be assembled and modified as the story is unfolding. For example, based on information received from a child or parent, different characters, subplots, or scenes may be introduced to the story.

Figure 1B:
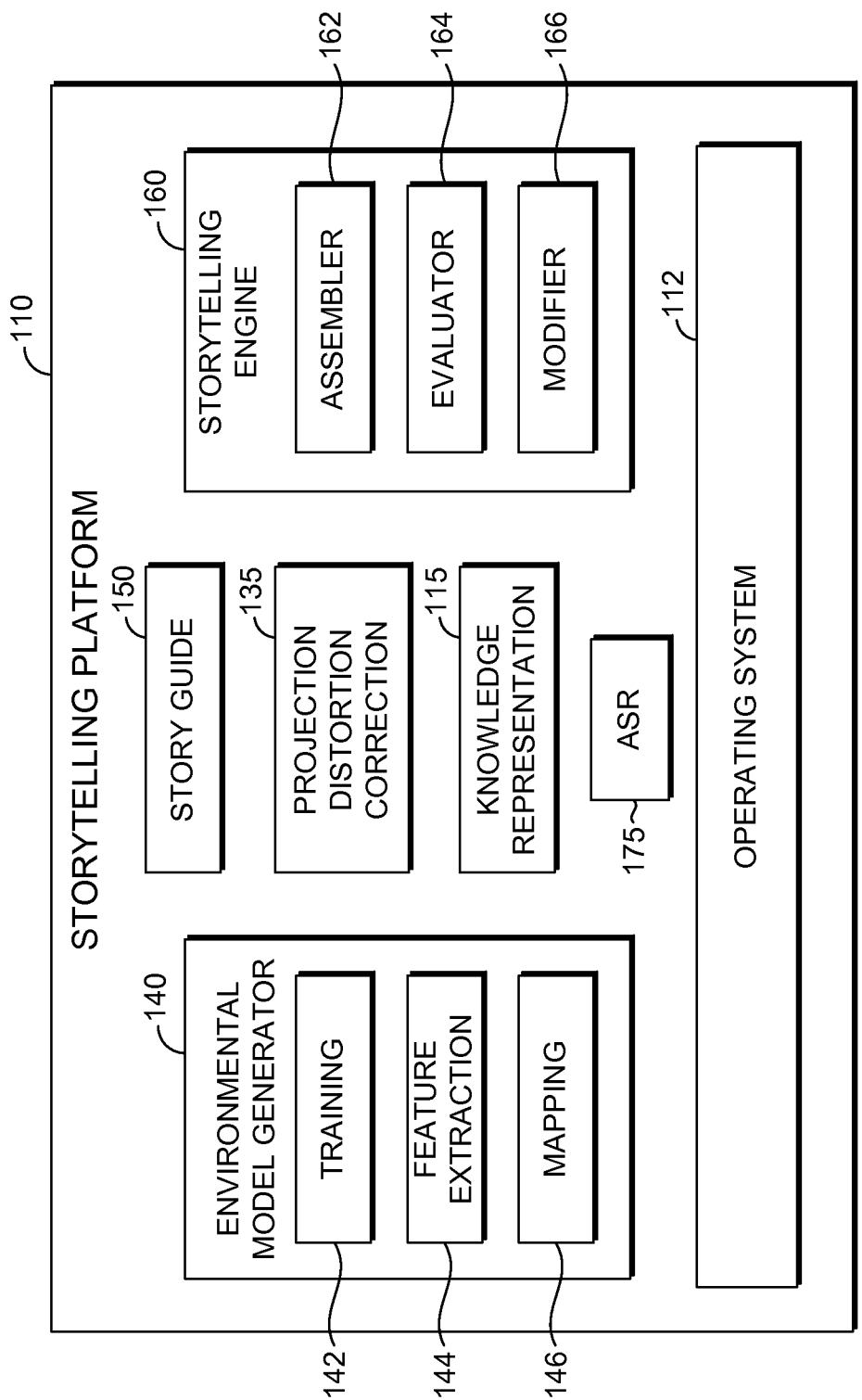
Figure 1C:
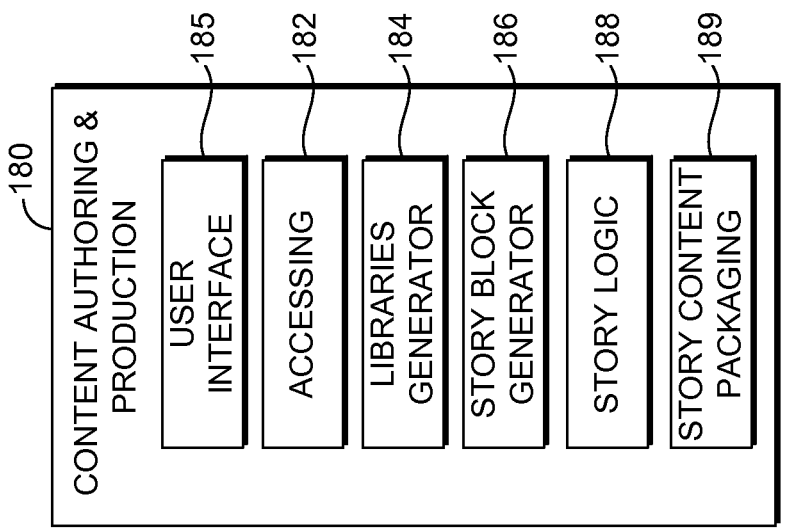

Turning now to FIGS. 1A, 1B, and 1C, a block diagram is provided showing aspects of one example of a system architecture suitable for implementing an embodiment of the invention and designated generally as system 100. It should be understood that this and other arrangements described herein are set forth only as examples. Thus, system 100 represents only one example of suitable computing system architectures. Other arrangements and elements (e.g., user interfaces, data stores, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions or services may be carried out by a processor executing instructions stored in memory.

Among other components not shown, system 100 includes a network 105 communicatively coupled to a storytelling platform 110, a user interface 155, a presentation component 130, a presentation environment sensor(s) 145, a storage 120, and a content authoring and production component 180. Embodiments of storytelling platform 110 are described in FIG. 1B and embodiments of content authoring & production component 180 are described in connection to FIG. 1C. The components shown in FIGS. 1A, 1B, and 1C may be implemented on or using one or more computing devices, such as computing device 900 described in connection to FIG. 9. Network 105 may include, without limitation, one or more local area networks (LANs) and/or wide area networks (WANs). Such networking environments are commonplace in offices, enterprise-wide computer networks, intranets, and the Internet. It should be understood that any number storage components (or data stores), user interfaces, presentation components, and content authoring and production components may be employed within the system 100 within the scope of the present invention. Each may comprise a single device or multiple devices cooperating in a distributed environment. For instance, storytelling platform 110 may be provided via multiple computing devices or components arranged in a distributed environment that collectively provide the functionality described herein. Additionally, other components not shown may also be included within the network environment.

Example system 100 includes one or more presentation components 130 for presenting a storytelling experience to a user. Presentation components 130 provide visual and/or audio content for a storytelling experience, which may be received over network 105 from storage 120 via storytelling platform 110. Embodiments of presentation components 130 comprise one or more image projectors (including video projectors), displays, screens, monitors, or the like, and may also include one or more speakers or other audio sources. Some embodiments of presentation components 130 may further include vibrational or motion-platform functionality for providing a physical or tangible effect as an enhanced storytelling experience.

In some embodiments, presentation components 130 project (or otherwise display) story content on the surfaces of a presentation environment, such as on the walls and/or ceiling of a user's bedroom. For example, with reference to FIG. 3E, an example presentation environment 301 is shown comprising a room with a window. Example presentation environment 301 includes presentation component 330, which is an example embodiment of presentation component 130 of FIG. 1A. In this example, presentation component 330 projects underwater story elements, such as fish 355 and seaweed 355, onto the surfaces (e.g., walls) of presentation environment 301, thereby creating an immersive effect of story content presentation. Presentation component 330 may also output underwater sound effects or other audio information for a story.

Further example embodiments of presentation components 130 are described in connection to presentation components 330 of FIGS. 3A-3D. With reference to FIG. 3A, a first example embodiment of a presentation component 330 is provided. Presentation component 330 of FIG. 3A includes an image projection component 333. In the particular example embodiment of FIG. 3A, projection component 333 comprises an omnidirectional projector system made up of one or more projectors and a hemispherical reflector (or one or more lenses performing the same function).

Omnidirectional projection on the walls and ceiling (for example) of a presentation environment (such as a child's room) typically introduces geometric distortions due to the shape of the environment. Accordingly, some embodiments of Narratarium projection technology include geometric transformation functionality, which may be embodied as a software or firmware service, for correcting the distortions before projection using standard mathematical techniques. (Additional details of projection distortion correction features are further described below in connection to projection distortion correction component 135 of FIG. 1B.)

Some embodiments of presentation component 330 include one or more sensor(s) 345 (which may be embodied as presentation environment sensors 145 of FIG. 1A). Sensor(s) 345 may comprise, by way of example and not limitation, one or more cameras, depth-imaging sensor(s), microphones, ambient light sensors, and motion sensors for receiving information from the presentation environment. Presentation component 330 also may include one or more speakers or other audio sources (not shown) for providing audio content.

Figure 3B:
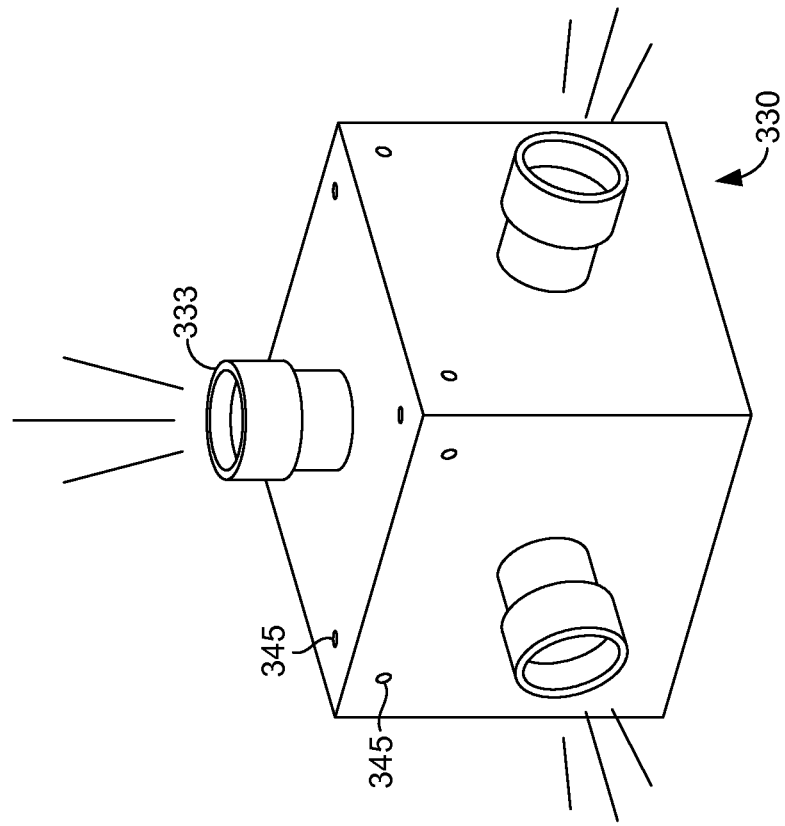
FIGS. 3A-3D depict aspects of example presentation components in accordance with an embodiment of the invention.
Figure 3A:
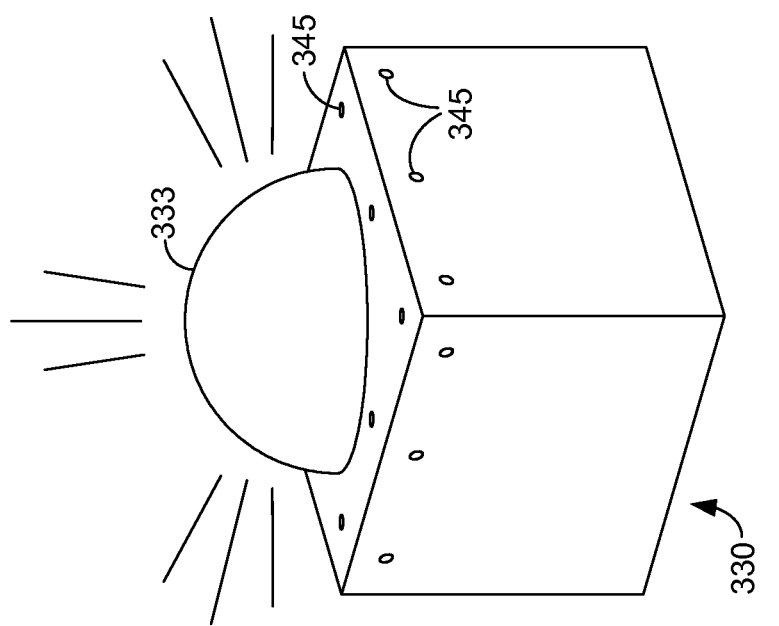

FIG. 3B depicts a second example embodiment of a presentation component 330, comprising multiple image projection components 333, each directed at a different direction. In this manner, the second example presentation component 330 of FIG. 3B can present content omnidirectionally, similar to the hemispherical projection component shown in FIG. 3A.

Figure 3D:
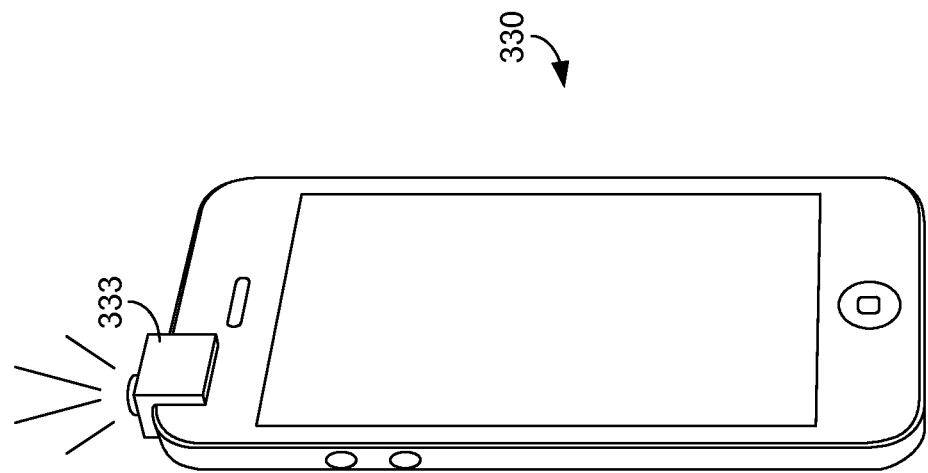
Figure 3C:
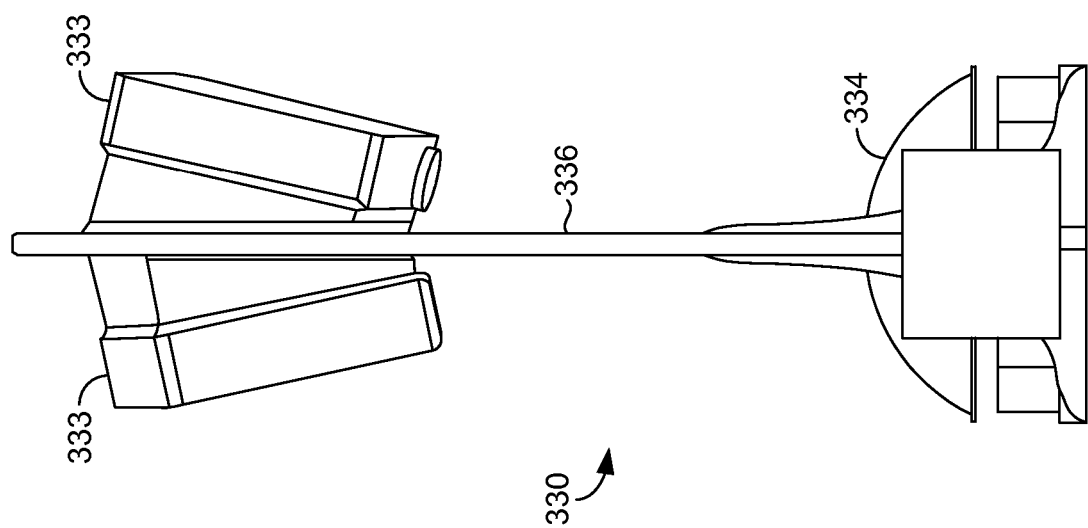

Turning to FIG. 3C, a third example embodiment of a presentation component 330 is provided. This example embodiment includes one or more video (or image) projectors 333, a hemispherical mirror (or lens performing the same function) 334, an audio speaker, which may comprise a stereo or surround-sound speaker system (not shown), and at least one sensor 345 (not shown) comprising an echo-canceling microphone operable for improved speech recognition while audio is played through the speaker system. In this particular example, projectors 333 and hemispherical mirror 334 are mounted to a rigid frame 336.

Figure 3E:
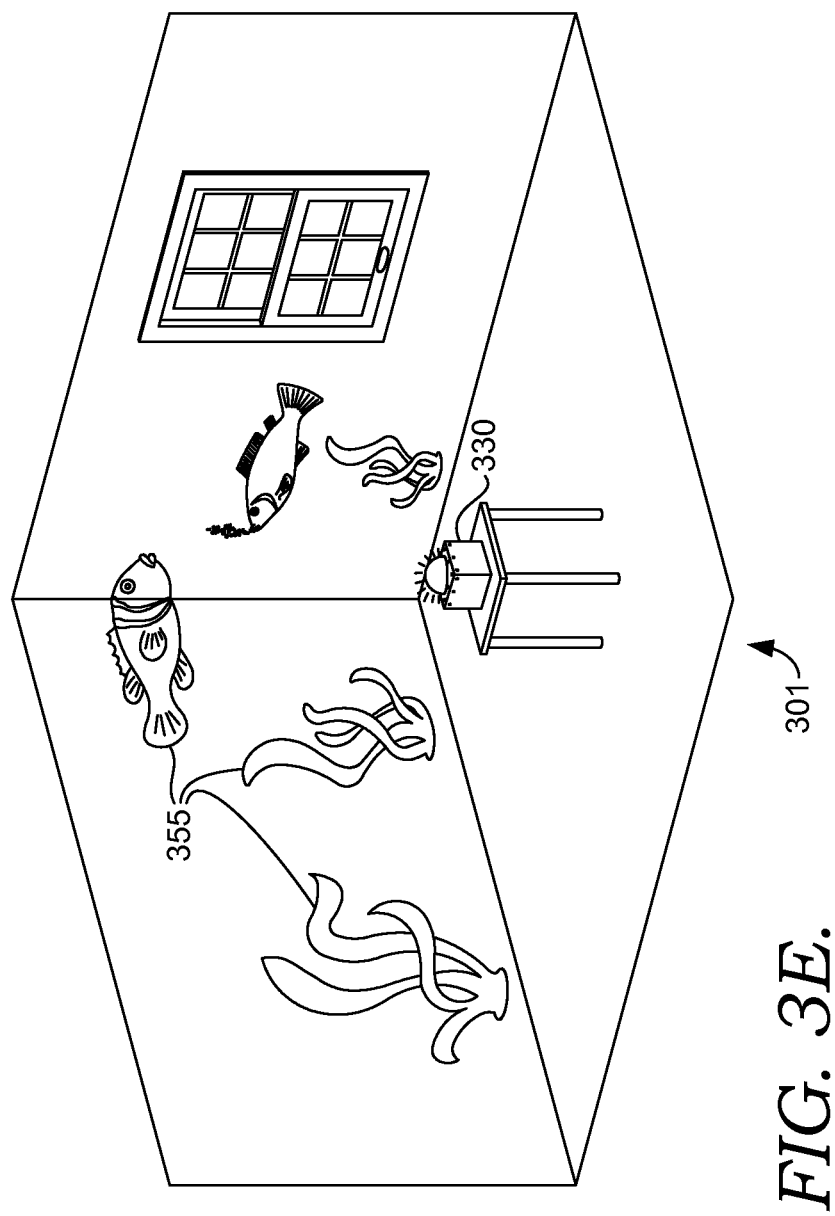
FIG. 3E depicts an example presentation environment with story content presented, in accordance with an embodiment of the invention.

Example presentation components 330 of FIG. 3A-3C may be positioned near the center of a room on a tabletop, such as shown in example presentation environment 301 of FIG. 3E. But other arrangements, including a suspended or wall-mounted position, are also considered. Moreover, in embodiments where projector distortion correction is employed, presentation component 330 may be positioned at nearly any user-convenient location, such as within proximity to an electrical outlet for power.

FIG. 3D depicts a fourth example embodiment of a presentation component 330. This example comprises an image projector 333 communicatively coupled to a user device, such as a smartphone. Such projector devices are commonly referred to as pico projectors. In this example, audio content may be provided by the user device's speaker (not shown), and presentation environment sensor(s) may include the microphone and/or cameras on the user device (also not shown). Some embodiments of the example presentation component 330 of FIG. 3D use a special lens on projector 333 and/or image distortion software to present surrounding or semi-surrounding visual content for providing an immersive experience.

Embodiments of the invention are not limited to the example presentation components 330 shown in FIGS. 3A-3D. It is contemplated that embodiments of the invention may use any type of presentation component for providing visual and/or audio story information to a user, including smart-glasses, virtual-reality goggles, television screens or display monitors, and screens from user devices (e.g., tablets, mobile phones, or the like).

Returning to FIGS. 1A, 1B, and 1C, example system 100 also includes one or more presentation environment sensor(s) 145. Sensor(s) 145 provide information from the presentation environment to storytelling platform 110 for facilitating storytelling. For example, such information might include spoken information from a user, such as words spoken, cadence, energy level, rate, spoken sound effects, singing, or other spoken and/or audible information; other sound generated by a user (e.g., clapping, tapping or patting, playing an instrument, etc.); physical information about the presentation environment, such as dimensions, presence, and/or location of objects in the presentation environment, such as toys, furniture, windows, doorways, etc., which may be incorporated into a story; ambient light; and information about the user, such as location, motion or gestures, activity level, position (e.g., the direction a user is facing), the number of users in the presentation environment, or other information that may be sensed from the presentation environment. Examples of sensor(s) 145 include, by way of example and not limitation, one or more cameras, depth-imaging or depth-determining systems, microphones, which might include noise-canceling functionality, ambient light sensors, motion sensors, scanners, GPS or location sensors, or other such devices capable of receiving information from the presentation environment. Sensor(s) 145 may be attached to presentation component(s) 130, may be a component of a user device, which may also be used for facilitating user interface 155 (such as the cameras, microphones, accelerometer, and other sensors on a smartphone, tablet, computing device, etc.), a toy or other object in the presentation environment, including, for example, toys that are manufactured to be compatible with some embodiments of the invention, or may include stand-alone sensors. In some embodiments, one or more sensor(s) may be remotely located from the presentation environment (despite being referred to herein as "presentation environment sensor(s)"); for example, in one embodiment, a remotely located storyteller tells a story and sensor(s) 145, which may be embodied as a microphone or camera on a smartphone or similar user device, receives audio and/or visual information from the remotely located storyteller.

Figure 4A:
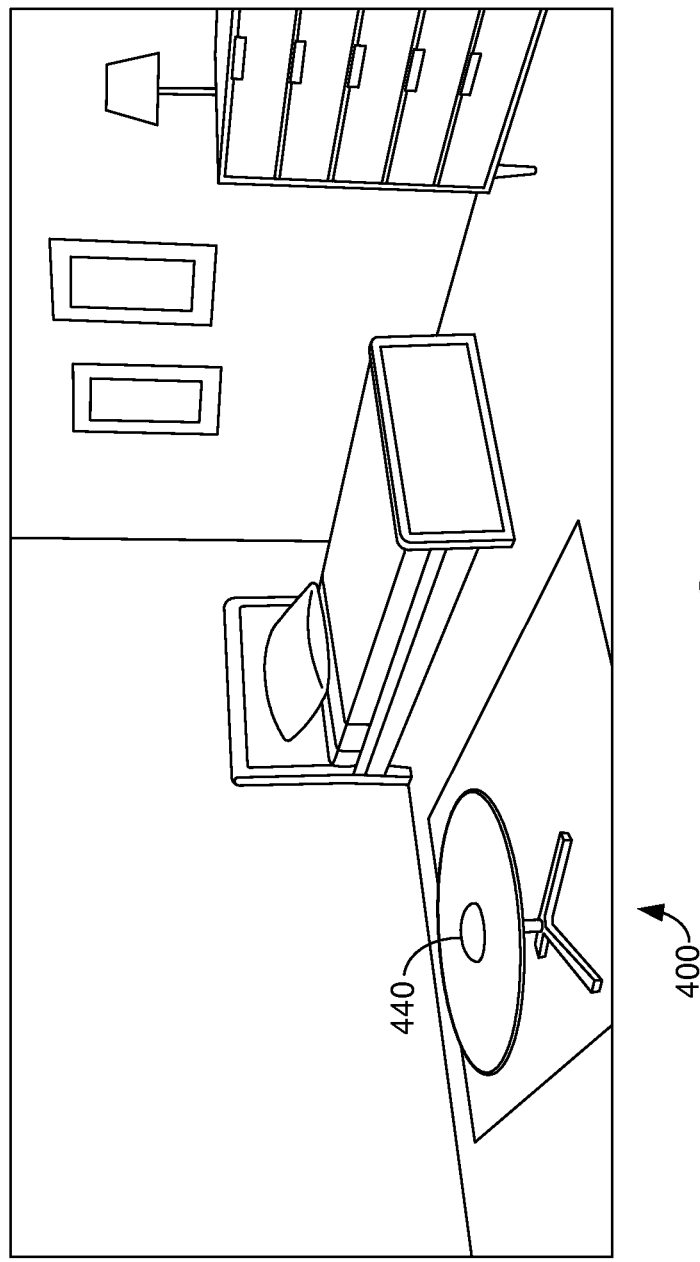
FIGS. 4A-4E depict aspects of determining an environmental model based on a presentation environment, in accordance with an embodiment of the invention.
Figure 4B:
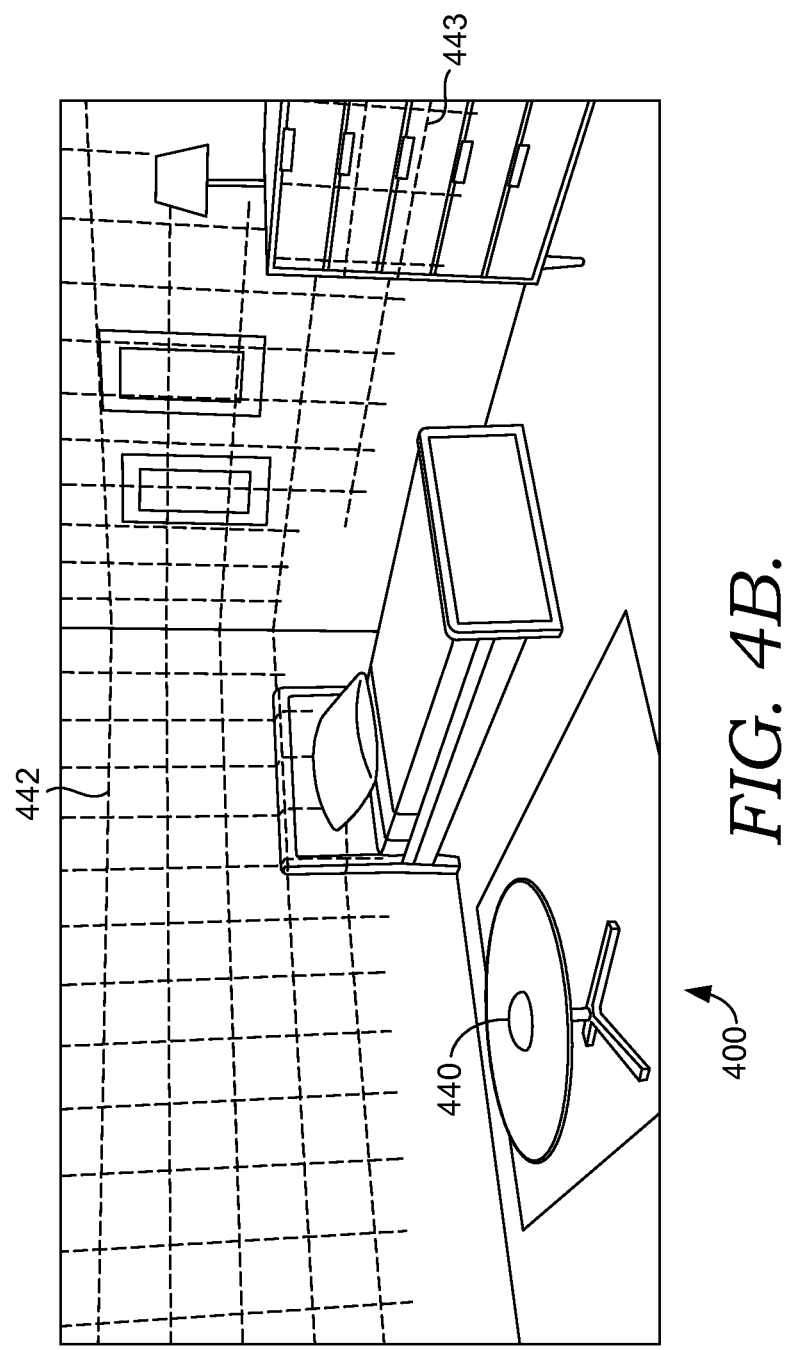
Figure 4C:
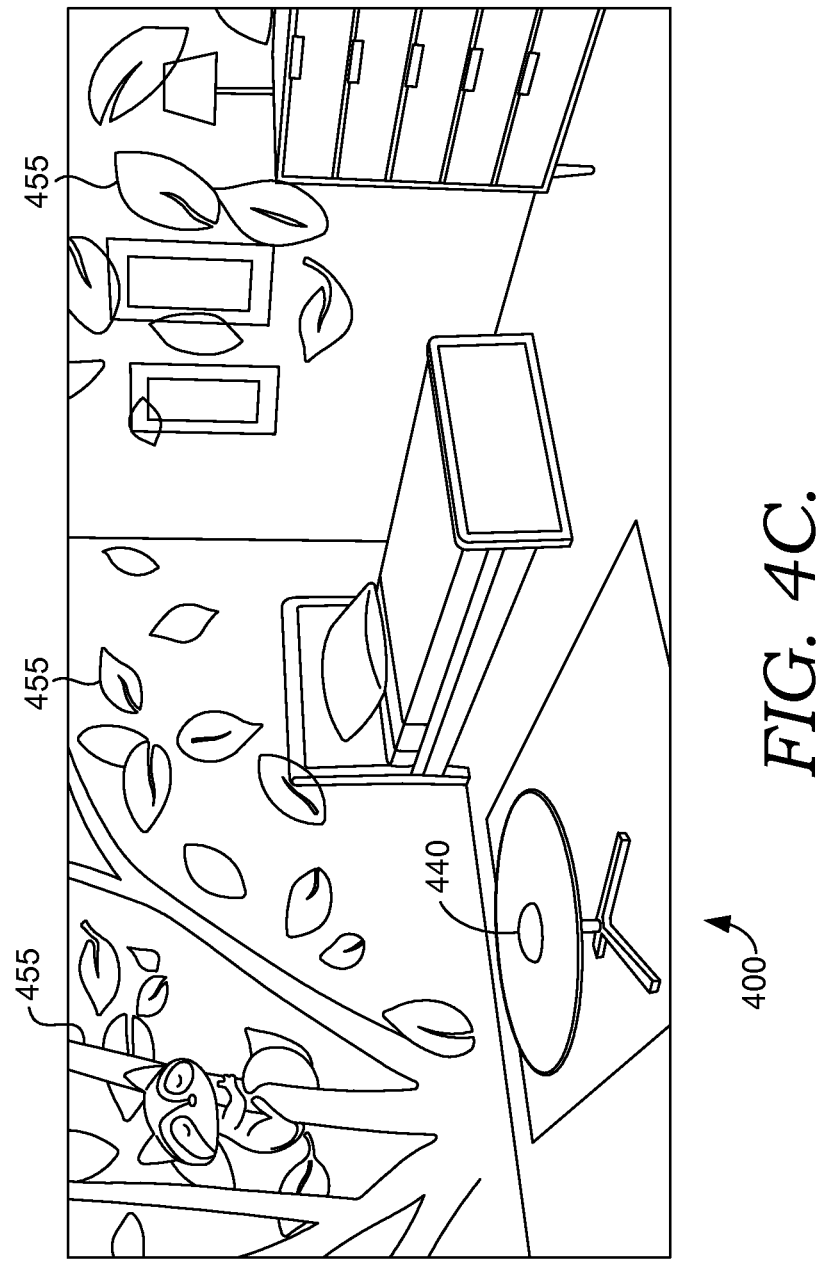

In one embodiment, sensor(s) 145 comprises device 440 of FIGS. 4A-4C, which is used in conjunction with environmental model generator 140 of FIG. 1B to generate a presentation environment model. The presentation environmental model may be used for incorporating objects or other features of the presentation environment into a story, for example, by modifying the location or actions of story elements (e.g., projecting an image of a bird as though it is flying into the room through an actual window.) Additional details of this embodiment are provided in connection with environmental model generator 140.

As previously described, sensor(s) 145 may be used to sense environmental information for determining story elements. For example, toys or objects in the room may be incorporated into a story. In some cases, the toys or objects may communicate with an embodiment of Narratarium or otherwise be detected, such as via optical or sensor recognition. Sensors on the Narratarium projector or worn by the user may detect information about movement or activity level, which can affect the story. For example, a story might involve the user exercising, dancing, or reaching out to touch or interact with a projected character. In one embodiment, a user's motions or gestures may be used for providing feedback during storytelling and modifying the story. For example, a user might point to a projected story element, such as a butterfly, and ask about it. In response, the butterfly might become part of the plot or lead the story in a different direction than if the user had pointed to another story element, such as a ladybug.

Example system 100 includes user interface component 155. User interface 155 provides functionality for facilitating interactions between a user and embodiments of Narratarium. Such functionality may be embodied as hardware components and/or software services. For example, in one embodiment, user interface 155 presents aspects of a story guide for assisting a user to tell a story including querying the user for story elements or suggesting story elements (e.g., characters, plot themes, etc.) and generating narrative text for a user (such as a parent) to read to a child, while corresponding images and sounds are presented via presentation component(s) 130, providing other information relevant to a storytelling experience, such as story duration and current time, and/or receiving feedback or other information from a user. Additional details of the story guide and user interface functionality are provided in connection to story guide component 150 of FIG. 1B and FIGS. 5A-5D.

Figures 5A, 5B:
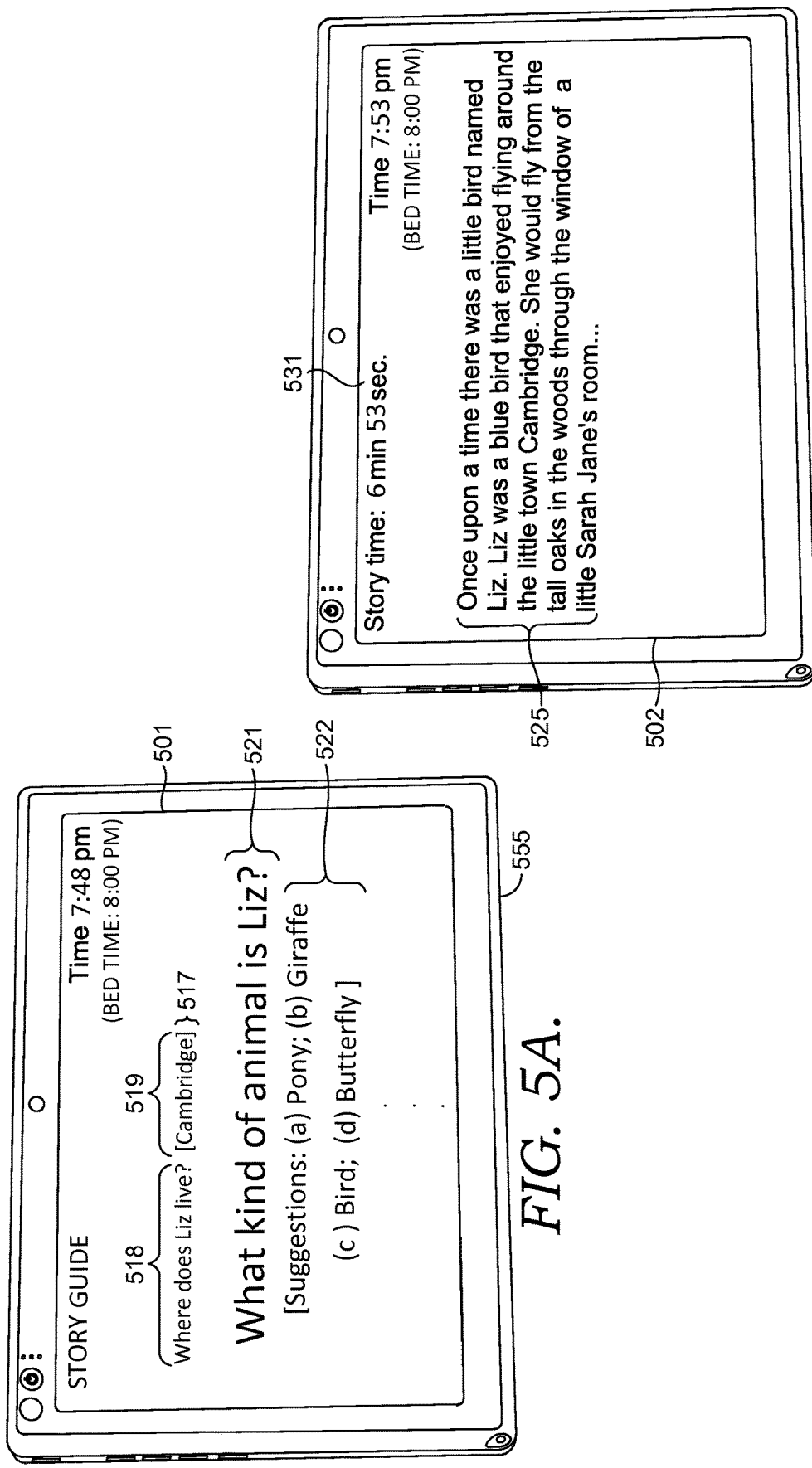
FIGS. 5A-5D depict aspects of a story guide, in accordance with an embodiment of the invention.

In one embodiment, user interface 155 comprises a graphical user interface (GUI), which may take the form of the example GUI provided in FIGS. 5A and 5B. User interface 155 may be provided through the imagery and sounds provided by presentation component(s) 130. In one embodiment, user interface 155 interacts with a user via audio or spoken information, for example, by modifying a story based an exclamation (e.g., "wow!") or a question detected and received from a child-user. In one embodiment, user interface 155 includes gesture or motion recognition (provided by sensor(s) 145) for detecting user actions. For example, a user may indicate an interest in a particular projected story element or other image (e.g., a butterfly). The user gesture detected through user interface 155 may then be used to modify the story, based on the gesture. Similarly, a story may be modified based on a detected user action, such as pointing, dancing, exercising, or other motion.

In some embodiments, user interface 155 is provided via presentation component(s) 130 or a user device, such as shown in FIGS. 5A-5B, which may comprise a computing device 900 described in FIG. 9. By way of example and not limitation, examples of user devices for supporting user interface 155 include a personal data assistant (PDA), a mobile device, smartphone, smart-watch, smart-glasses (or other wearable smart device), a laptop, a tablet, a remote control, an entertainment system, a vehicle computer system, an embedded system controller, an appliance, a home computer system, a security system, a consumer electronics device, or another similar electronics device.

Example system 100 also includes storage 120. Storage 120 generally stores information including data, computer instructions (e.g., software program instructions, routines, or services), conditions, rules, user preferences, and/or models used in embodiments of the invention described herein. Further, although depicted as a single data store component for the sake of clarity, storage 120 may be embodied as one or more information stores for storing information locally, including memory on presentation component 130, a user device (not shown), storytelling platform 110, and content authoring and production component 180, or storing information in the cloud.

As shown in example system 100, storage 120 stores one or more story structures 121 (or coded story representations), presentation environmental model(s) 123, generated by environmental model generator 140 and one or more story resources libraries 125, which might include videos, sounds, pictures, storylines, transitions, coded stories and/or story threads and/or story blocks generated by content authoring and production component 180, and/or other content, used for assembling or presenting stories. Story structure(s) 121 are used by storytelling engine 160 for determining an immersive dynamic story and are further described in connection to content authoring and production component 180 of FIG. 1C and storytelling engine 160 of FIG. 1B. In some embodiments, resources library 125 may include specific content provided by a publisher of a book or other third party intended for use with specific stories, for example, and also content provided by Hallmark, user-provided content, or generic content for use with freeform story-genre recognition. For example, wherein a user starts telling a story, and story elements are identified (via sensor(s) 145, automatic speech recognition (ASR) component 175, and knowledge representation component 115) and presented over presentation component(s) 130, such as a user telling a story about a butterfly, and in response a butterfly is presented flying in through a user's window and landing on a flower projected on the user's night stand.

Some embodiments of storage 120 also include story logic 127, which may include story guide content and information (e.g., instructions, conditions, guidelines, queries, choices, options, branches, etc.) and other functions used by story guide 150, for example, functionality for listening to a user tell a story, determining a level of assistance needed by the user, and providing assistance, through user interface 155, based on the determination. Story logic 127 may also include relationships, rules, parameters, story structure elements, paths, etc., which may be invoked by storytelling engine 160 for story creation, modification, and presentation. For example, a bedtime rule or condition may indicate that a story should end by the user's bedtime and should wind down energy level so as to prepare a user for sleep. In some embodiments, story logic 127 may also be associated with items in the resources library 125 and/or relationships knowledge representation component 115; for example, a penguin might be associated with library items such as scenes and sounds of the arctic.

Some embodiments of storage 120 also stores user information 129, which may include, by way of example and not limitation, user preferences (e.g., favorite characters, themes, user(s)' bedtime information), which may be used by storytelling engine 160 for determining story length and energy level; previous stories (including dynamic stories) presented to a user, which may be used for presenting a user's favorite story elements (e.g., characters, themes, etc.) more frequently or presenting new story elements (e.g., new plots, settings, characters, etc.); user profiles, which may be used for storing user information when there is more than one user, and which may include voice profile information for identifying a user based on their voice; user accounts or account information, which may be used by embodiments providing content through a subscription model or downloadable story packages or expansion sets, or may facilitate users sharing their stories or story content with other users on other Narratarium systems.

In some embodiments, user information 129 also includes environmental models of presentation environments associated with a particular user. Thus, although storage 120 is shown as including stored information items 123, 125, 127, and 129, these information items may be part of the same information item or other information items (not shown). Additionally, additional information items not shown (such as computer instructions) may be stored in storage 120.

Turning to FIG. 1C, an example embodiment of content authoring and production component 180 from system 100 of FIG. 1A is provided. Content authoring and production component 180 (sometimes referred to herein as "production component 180") includes functionality for developing Narratarium story content and Narratarium-compatible stories, and in some embodiments may be considered a content authoring and production platform. In one embodiment, the production component 180 comprises a software application tool, and associated hardware and software components, for use by content producers, such as publishers, developers, or in some cases a Narratarium user. In some embodiments of the Narratarium, a dynamic story may be provided from non-linear story elements (see, e.g., FIGS. 6A-6C), with the story capable of being modified as it is presented in real time. Therefore, some embodiments of the production component 180 include functionality for establishing the logic, conditions, and other associations between story elements including, for example, branches to story threads or blocks, character settings (e.g., penguins live in the arctic not the desert), or sound and visual imagery correspondence.

As shown in the example embodiment of FIG. 1C, content authoring and production component 180 includes a user interface component 185, an accessing/storing component 182, a libraries generator 184, a story block generator (or story thread generator) 186, story element logic 188, and story content packaging 189. User interface component 185 generally facilitates creation of story content by a developer and may be embodied as a graphical user interface (GUI) and corresponding computer application. One example of production component 180 with a GUI as user interface 185 is provided in FIG. 8.

Accessing/storing component 182 generally provides read/write access for raw story resources, story elements, and other content and for storing story content for use by a storytelling platform 110 for providing an immersive storytelling experience. For example, accessing component 182 may accesses raw story content, such as videos, images, sounds, etc., as well as already produced content, for creating a library for particulars or themes, such as images of penguins and icebergs and sounds of splashing, cracking ice, and howling winds, for a penguin or arctic theme library. Libraries generator 184 generally facilitates creating story libraries, including story resources, such as videos, sounds, pictures, story lines, transitions, and other content, used for assembling or presenting stories and story logic (e.g., instructions, conditions, guidelines, relationships, parameters, story structure elements, paths, rules, etc., between one or more story resources or elements), which may be invoked for story creation and presentation. Story libraries may be generated to be generic and support a variety of stories or may be specific to a particular story. In one embodiment, a coded story, which may be generated by production component 180 (and used by storytelling platform 110 for providing a dynamic story), includes pointers to story libraries and the resources contained in those libraries, much the same way object-oriented programming uses libraries of code. In some embodiments, story resources stored in a library are related to each other or are of the same class or type, for example, a library of arctic-themed story content, a library of only videos or only sounds, etc., or a library of conditions, rules, or story logic that is referenced when playing back any story.

Story block generator 186 generally facilitates creating story blocks or story threads. Examples of story blocks or story threads are described in connection to FIGS. 6A-6C. At a high level, a story block includes a module of a story, such as a scene or scene-portion, with character(s), setting, sounds and images (which may be dependent on the character(s), rather than the particular story block), plot or character interactions including dialog, etc. A story may be composed by assembling a sequence of one or more story blocks. Some blocks may be designated as beginning or ending blocks, and some blocks may include branching logic to point to more than one subsequent story block, based on, for example, certain conditions (e.g., story duration or desired excitement level) or user selection. A single story block may include information about character(s), setting(s), or other story elements, or may include templates or placeholders for such story elements. For example, a block may include a story event, such as a conversation between two characters, but may not specify the particular characters or setting. Rather, at the time the story is presented, storytelling platform 110, and in particular, storytelling engine 160, instantiates the story block with the templates populated by character(s), setting(s), or other story elements. Storytelling engine 160 may utilize user-provided information obtained via story guide 150 (of FIG. 1B) or other information for determining which particular character(s), setting(s), or story elements to use, as well as which blocks to use and an order of the block sequence. For example, where the user's favorite character is a butterfly, a butterfly may be used as the character, with a corresponding setting determined to be a field of flowers. Similarly, a butterfly may be used wherein the user selects a butterfly in response to a query presented over user interface 155 near the beginning of the storytelling experience.

Embodiments of story blocks may contain other information as well, such as metadata about the particular block, for example, without limitation, a block identification (ID) identifying the block, information about the duration of the block, energy level, number of characters, compatible characters or settings or other story elements, plot information, IDs of blocks compatible before or after the present block, transition logic and content for determining future compatible blocks and transitioning from a previous block and/or to a subsequent block, libraries referenced or called by the block, and information indicating whether the block is a beginning, terminating, beginning-branching or ending-branching, or serial (non-branching) block. In some embodiments, the metadata specifies input and output information for the block (including branching blocks) to facilitate assembling the blocks into an ordered sequence that is internally consistent for a story.

Figure 6A:
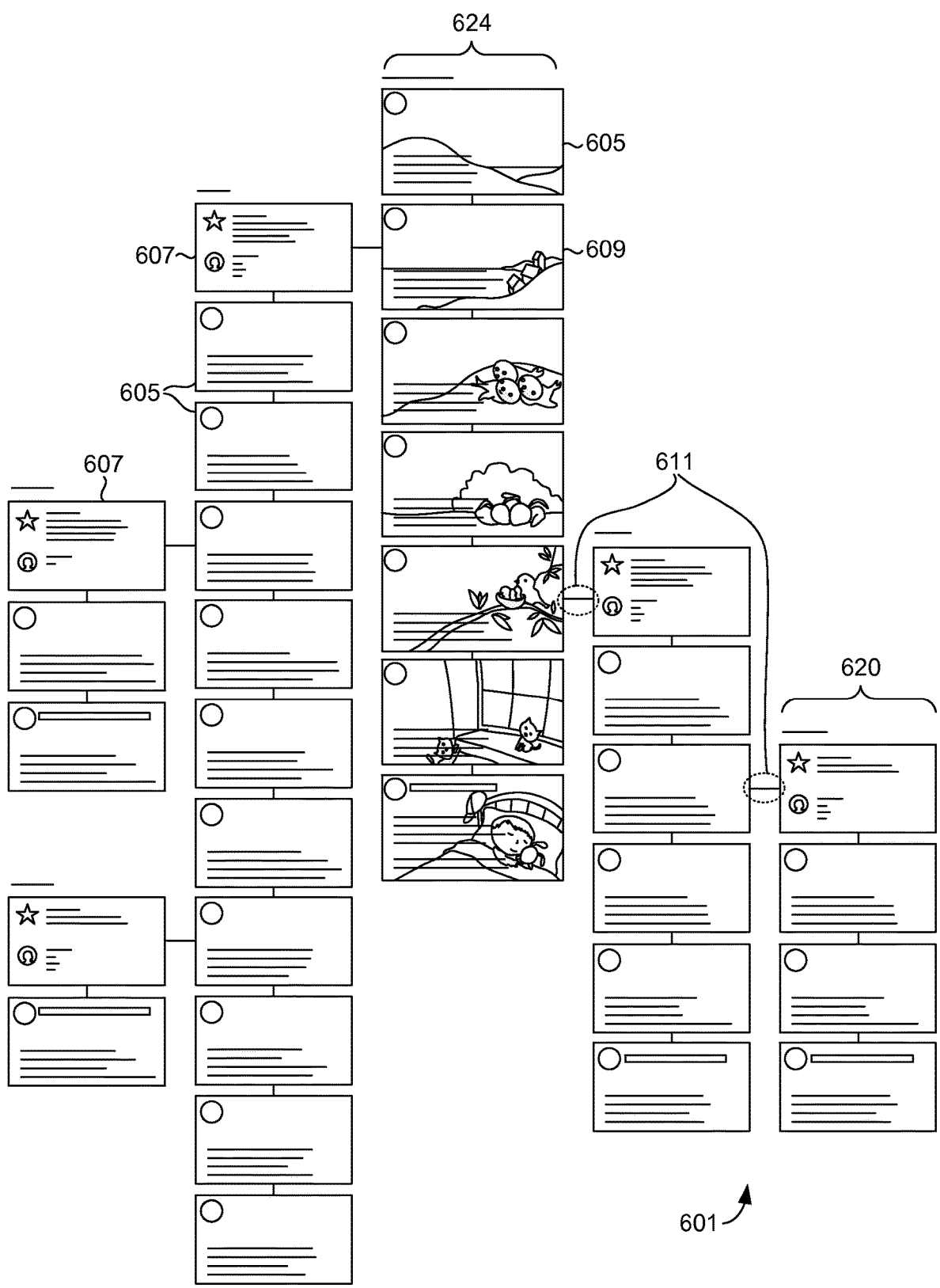
FIGS. 6A-6C depict aspects of dynamic story assembly, in accordance with an embodiment of the invention.
Figure 6B:
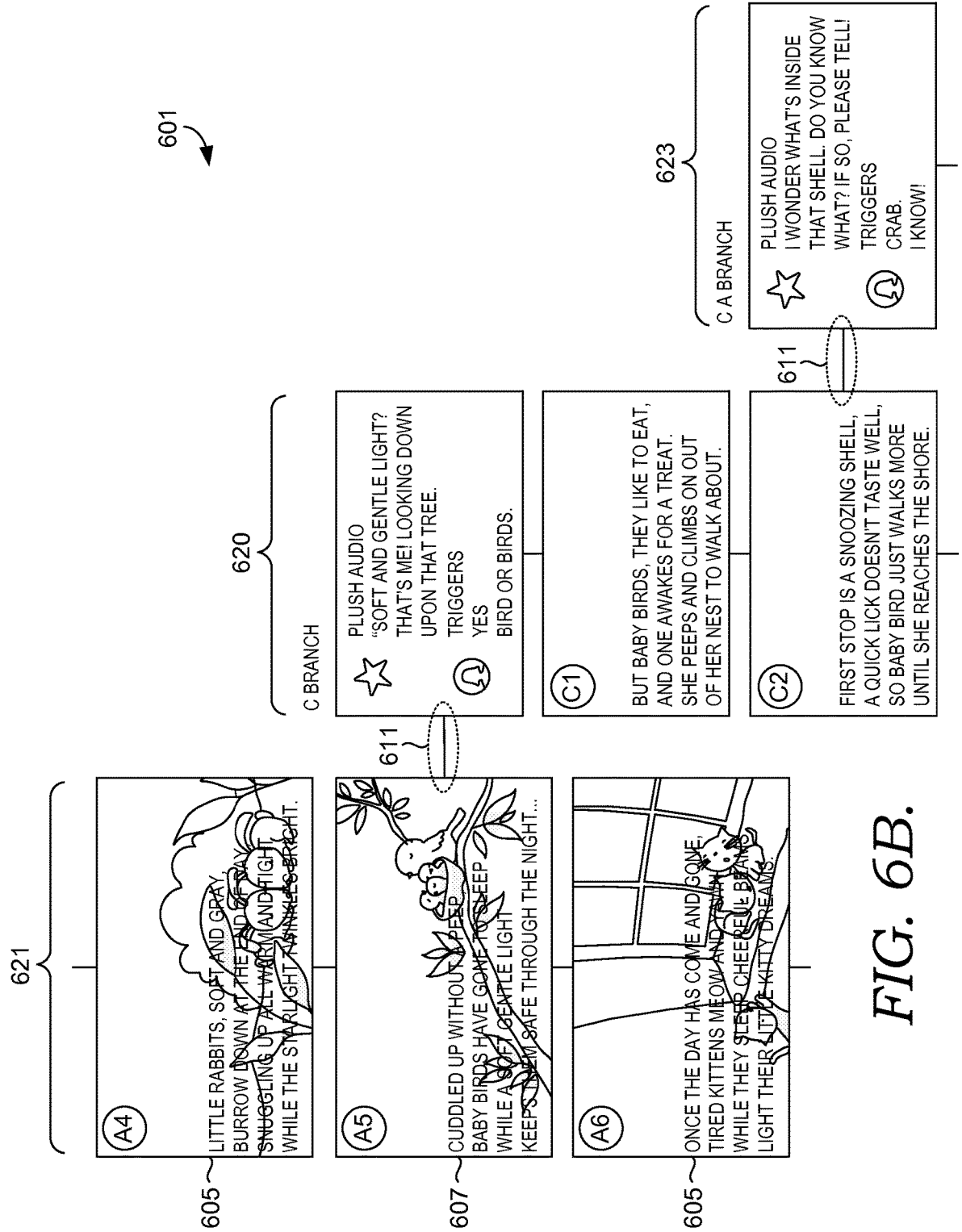

A segment of story blocks comprises a story thread or story line. An organized set of related story lines comprises a story framework or structure. With reference to FIGS. 6A and 6B, a set of story blocks and story lines for a story is provided and referred to as story structure 601. Story structure 601 may be created by production component 180, in some embodiments, or by storytelling engine 160 in some embodiments. (As described in further detail in connection to FIG. 1B, storytelling engine 160 may modify existing story structures or assemble them from story blocks or threads, including assembling the story structures and populating the blocks with story content in near real time). For example, production component 180 produces a coded story that can include, in one embodiment, an ordered sequence of story blocks or threads with branching logic specifying conditions for branching to other threads in the structure. Accordingly, structure 601 is one example of such a story structure and includes blocks, such as serial blocks 605, beginning-branching blocks 607, and ending-branching blocks 609.

Structure 601 also includes story branches 611 and example story threads or story lines 620 and 624. In some cases, story logic, user input (which may be unsolicited or received through story guide 150 by a prompt) is used to determine whether and where to branch the story to a different thread. For example, in some embodiments, specific scenes may have hard-coded branch choices or loose associations with other threads, wherein the story would remain internally consistent by branching to another thread. Furthermore, in some embodiments, as described above, because the story blocks include story-element placeholders or templates, the story lines are thus generic with respect to the characters, settings, or certain other story elements, such that a particular story element (perhaps a character, which is chosen in real time by the child-user) may be determined as the protagonist in the story line and populated into the story blocks of the assembled story by storytelling engine 160.

FIG. 6B shows a close-up representation of a portion of story structure 601. FIG. 6B shows blocks 605, beginning-branch block 607, branches 611, and story lines 620, 621, and 623. As can be seen, this portion of structure 601 includes three story threads: story thread A (item 621), thread C (item 620), and another thread (item 623). From the example structure 601, it can be seen that a story following story thread 621 progresses to block 607 (designated as "A5"), where it may next continue to the block designated as A6 or may branch to thread 620 and then continue to a block designated as C1, then to block C2, where again the story may branch to thread 623 or may continue in thread 620.

Structure 601 illustrates how dynamic story content for supporting a dynamic story can be provided by production component 180. Accordingly, one possible embodiment of production component 180 generates such a structure, which may be embodied as a coded story, which is further described below. It also illustrates how a dynamic story can be instantiated from a structure 601 by storytelling engine 160, wherein the block templates or placeholders are filled with specific story content for the story being presented. By way of example and not limitation, placeholders may be used for story elements including not only characters, settings, sound effects, visual images, animations, videos, etc., but also story logic; prompts or guidance provided by story guide 150; story blocks or threads; story element positions and/or motion paths (which may be predetermined from among a number of positions or motion paths and wherein the beginning or ending of the path is the placeholder to be determined from near storytelling time or from an environmental model); or any other aspect of storytelling content that may desired to be modified near storytelling time by storytelling engine 160.

Figure 6C:
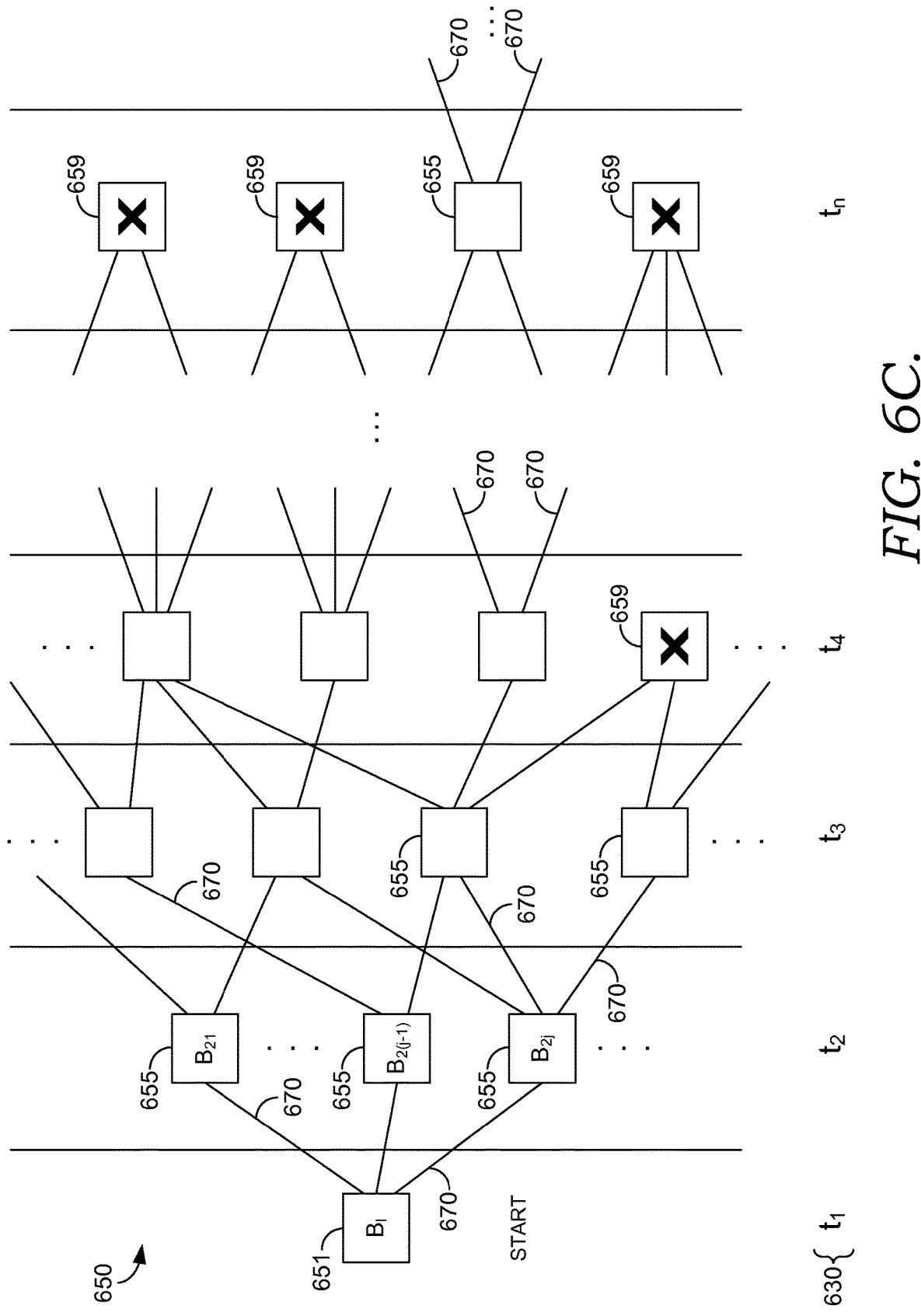

Turning to FIG. 6C, a different example of a story structure or framework is illustratively provided and referenced generally as structure 650. Story structure 650 comprises an arranged set of story blocks, including beginning block 651, blocks 655, and terminating blocks 659. Beginning and terminating blocks 651 and 659, respectively, may correspond to the beginning and ending of a story or a scene or story thread. The blocks comprising structure 650 are arranged over time frames 630, including $t_1$, $t_2$, through $t_n$. Although each time frame $t_1$ to $t_n$ is illustrated as having the same size, it is contemplated that in some embodiments, the time frames are not equal. Thus, for example, $t_1$ may be longer than $t_4$.

Structure 650 also shows branch relationships 670 that span from various blocks to other blocks in previous or subsequent time frames. In one embodiment, branch relationships 670 represent probabilistic relationships between blocks. In particular, a branch relationship 670 has a corresponding weighing that represents the probability that a particular block on one end of the branch relationship will follow a current block on the other end, given that current block, the blocks from previous time frames, and/or other conditions. In this manner, a story structure can be determined in advance that is capable of providing a dynamic storytelling experience and responding dynamically to a user or presentation environment as the story is presented. As conditions change or as new information is provided by a user, such as may occur as a parent tells a story in real time, a specific sequence of blocks can be instantiated, populated, and assembled in near real time, by storytelling engine 160, for telling the story. Further, in some embodiments, a future sequence (or future sequences) of blocks representing the most probable orderings can be assembled as well.

Each time frame t includes a set of potential blocks available for the story at that particular time frame. For example, time frame $t_1$ includes only one block (labeled $B_1$) and time frame $t_2$ includes blocks $B_{21}$ through $B_{2(j-1)}$ and $B_{2j}$. In some embodiments, an assembled story uses one of the blocks for a particular time frame; thus in time frame $t_2$, only one of blocks $B_{21}$ through $B_{2(j-1)}$ and $B_{2j}$ will be used. (It is contemplated that a particular block may be potentially available for more than one time frame; for example, a particular block that includes template or placeholder information for a conversation between two characters may be available in time frame $t_3$ and again in time frame $t_7$. Where both blocks are used to assemble a story, two conversations will occur.) A determined sequence or set of blocks or threads, including branching threads or probabilistic paths of blocks for a story, comprises one embodiment of a coded story.

Returning to FIG. 1C, story logic 188 generally facilitates determining conditions, relationships, or rules for story content for use when assembling a story by storytelling engine 160. For example, such logic might indicate that the story duration should not be so long as to keep a user up beyond his or her bedtime. (Thus, the logic might include instructions for setting a story duration to be less than or equal to the time difference from the current time to the bedtime. Based on this, a story block structure, such as structure 650 of FIG. 6C, may be determined having an appropriate length.) Other examples of story logic 188 include relationships between story elements; logic for the presentation environment, which may be based on a presentation environmental model (for example, logic specifying to modify the story or a story element such as a character's position or movement based on objects present in the presentation environment, such as modifying a story so that a character enters or exits through an actual doorway); logic for facilitating user assistance, including detecting when a user is struggling based on changes in cadence; suggested narration for a user-storyteller; logic for facilitating understanding of user feedback such as logic associated with gestures or motions indicating story modifications or introduction of a story guide, based on detected user action or utterances; and prompts to query the user (such as shown in FIG. 5A), for example.

In one embodiment, story logic 188 includes logic for facilitating story guide 150, including, for example, sets of prompts corresponding to a particular story and logic for whether or when to present the prompts. In one embodiment, story logic 188 may include logic for branching to different story threads based on a user response to a presented option, such as "do you go inside the house, or do you stay outside?" In another example, story logic 188 may include logic for branching to different story threads based on whether a user points to or motions towards a particular story element, such as a firefly that just entered the scene. For example, upon touching or gesturing towards the projected image of a firefly, a new story thread incorporating the firefly may be utilized for continuing the story presentation. In this way, the story can be made flexible in that it is dynamic and responsive to the user, by branching or otherwise changing based on the story logic.

In particular, continuing the example with the firefly, a story element, such as the firefly, may be introduced into the story by storytelling engine 160, in order to motivate the user to respond to the new element (the firefly) and thereby modify the existing story based on the user's response (e.g., touching or asking about the firefly.) The modified story may be different (different than the story that would have been presented had the user not noticed the firefly) in terms of length, energy level, new characters, themes, or other content or differences. In one embodiment, story logic includes logic for altering the story (or presenting story content for facilitating story branching, such as the firefly example) based on a determined attention level of the child. Where the child appears distracted, logic may specify introducing a heightened energy level, which may correspond to more sound effects, visual movement, or character actions.

Continuing with FIG. 1C, story content packaging component 189 generally facilitates packaging or bundling content produced through production component 180 so that it can be used by a user on an embodiment of a Narratarium. In one embodiment, story content packaging component 189 (sometimes referred to as "packaging component 189") produces a story script and an associated set of story resources (such as one or more libraries, story content, logic, etc.) for use by storytelling engine 160 to assemble, evaluate, or modify a story. In one embodiment, packaging component 189 produces a coded story and associated libraries or presentation resources (e.g., images, sounds, other libraries) referenced by the story. In one embodiment, a coded story comprises a script, which may be in the form of a markup language, indicating an order (or probable order or an arrangement) of story blocks or story structures, and may also include logic, libraries, and/or other story elements (e.g., sound effects, video, etc.). In an embodiment, story content is included (or pointed to by the coded story) in a manner corresponding to locations of the story wherein the story element should be introduced (for example, playing a sound of a wave crashing when the story shows an image of a beach).

As described above, some embodiments of production component 180 include functionality for developing Narratarium story content and Narratarium-compatible stories. In some embodiments, this includes an immersive story experience that wraps a projected visual story around the audience while playing layered audio, such as music, character dialog, sound effects, etc. To create story experiences for Narratarium, some embodiments of production component 180 generate a "coded story" that details (directly or indirectly via logical conditions, called libraries, functions, pointers, or the like) each projected story element, how it should behave and respond to the stimuli of other elements, what sounds are associated with it, etc.

Typically, the level of information needed in a coded story representation would be challenging or even tedious to be provided by those most commonly given the task of creating stories, like writers and designers. Moreover, conventional writers and media designers already have tools like word processors, video editors, presentation editors, and animation editors that take relatively simple user input to create often complex, linear experiences. But since the story experience provided by embodiments of the invention include a non-linear interactive experience form, certain creation and editing tools are needed to support this platform. Some embodiments of production component 180 provide these tools.

Accordingly, one embodiment of production component 180 comprises a software application tool, which may be used by content or story producers, such as publishers, developers, writers, or in some cases a Narratarium user. In particular, one embodiment includes a software application tool for new story creation and an editing tool for use with Narratarium-compatible stories and other story content including story elements. In some embodiments, production component 180, or an aspect thereof, may be embodied as a stand-alone application, a suite of computer programs, a plug-in or component of an existing program such as a word processor, database manager, animation editor, or XML editor, for example. In some cases, conventional word processors, video editors, animation editors, presentation editors, and other design software applications, such as those listed above, can be used to edit individual media elements (images, video files, audio, text, etc.) that ultimately become part of an immersive story experience. But unlike the software programs listed above, at lease some embodiments of production component 180 provide a storytelling editor that outputs a coded story representation (which may take the form of a script or recipe, in an embodiment) to guide the knowledge-based functionalities of storytelling platform 110.

As previously described, because the stories used by embodiments of the invention may be non-linear and capable of being modified as they are presented in real time, an embodiment of production component 180 includes functionality for establishing the logic, conditions, and other associations between story elements including, for example, branches (including probabilistic branches) to story blocks or threads, character settings (e.g., penguins live in the arctic not the desert), or sound and visual imagery correspondence. Accordingly, in an embodiment, the coded story includes references to and/or linkages between each of the individual story elements and/or other media files. For example, while the user is reading aspects of the story provided by story guide 150, a script of the coded story may specify that a particular video should be played at a certain time or that a specific sound should play only in the presence of a particular image. Further, in some embodiments, production component 180 includes functionality for supporting "hypertext-like," non-linear story paths, which may also be placeholders or templates. Hypertext in this context refers to text (or a story path) which is not constrained to be linear (i.e., contains links to other story pages/paths). In this manner, a story structure or other arrangement of story blocks or threads, with corresponding story elements (including story libraries, logic, prompts or guide information, story resources (images, sounds, etc.), and the like), may be produced for use by a storytelling platform 110, even though the specific blocks or threads are not determined until near storytelling time (nor are the specific story elements in those blocks necessarily determined until near storytelling time, where the blocks contain placeholders or templates).

Thus, some embodiments of production component 180 can provide a narrative development environment (NDE) that provides the story producer with a human-readable story experience editor and then compiles that narrative to a form that runs on or is usable by a storytelling platform 110 of Narratarium. Such embodiments of production component 180 therefore provide a way for writers, designers, and other producers to more easily describe and create a story and its characters in detail, in a way that best suits their most comfortable way of thinking and working. For example, one embodiment of production component 180 enables a producer (which may also be a Narratarium user) to employ a variety of possible ways to use graphical user interface (GUI) tools to define story elements including, for example: story characters, the general narrative flow of the end user experience, and the narrative structure of that experience. In one embodiment, the coded story representation exported or generated by production component 180 takes the form of a markup language like XML, wherein production component 180 uses typical PC GUI elements to tag and describe specific story elements. In one embodiment, aspects of production component 180 are similar to a word processer or database program in that production component 180 takes input from the user (via a wide range of traditional means such as a keyboard/mouse, or even through more advanced methods like voice or gesture), interprets that input, represents that input on the screen, and exports the representation in a form that can be correctly interpreted by the storytelling platform 110.

Figure 8:
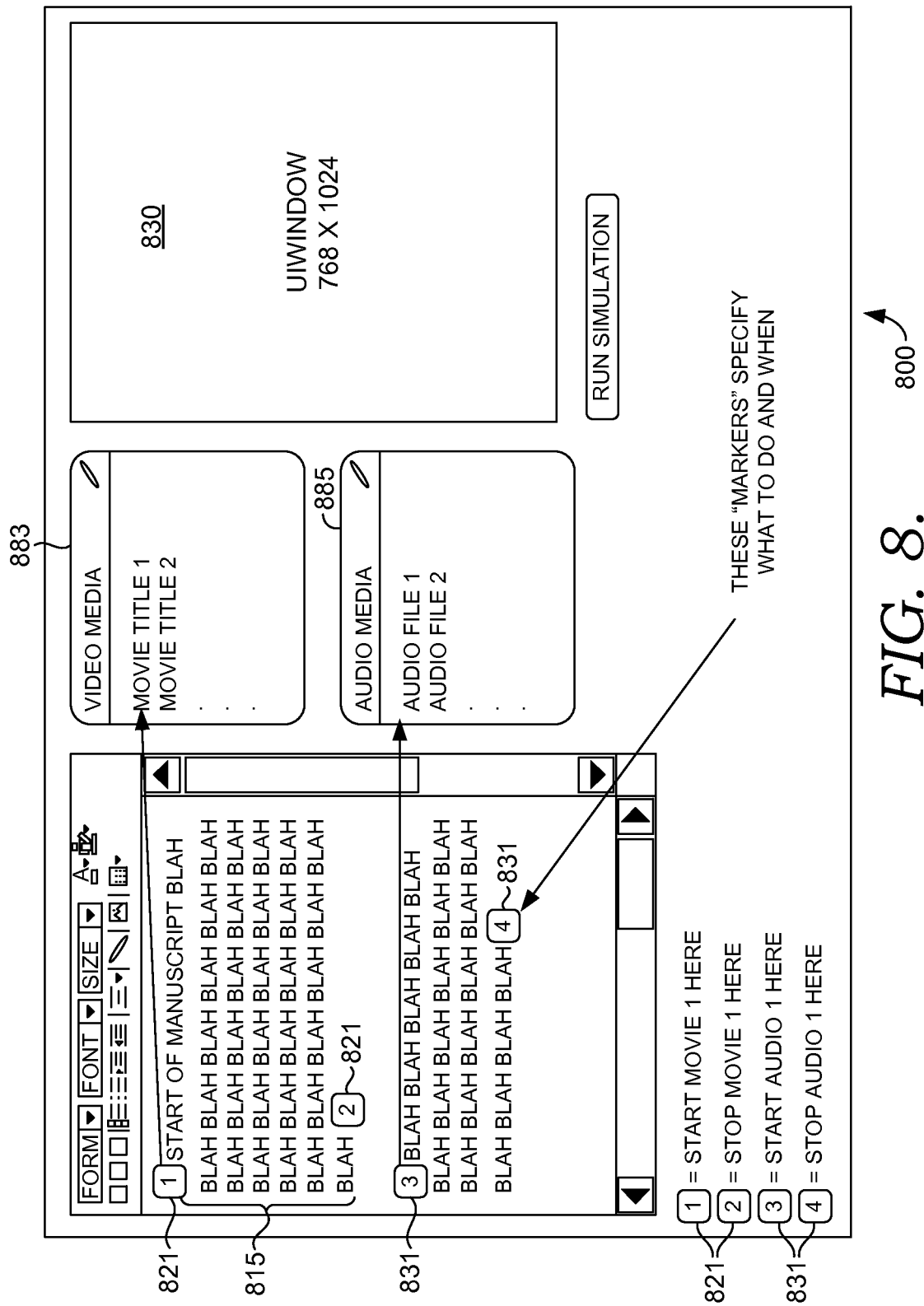
FIG. 8 depicts aspects of a computer application for use in producing story content, in accordance with an embodiment of the invention.

With reference to FIG. 8, an example embodiment of a GUI for a software application aspect of production component 180 is provided and referred to generally as GUI 800. GUI 800 includes a user interface window (UIWindow) 830 for viewing visual story elements, story logic (including rules, conditions, etc.), or other visual story content. GUI 800 also includes various windows, such as video media 883 and audio media 885, depicting story resources that may be used for creating a coded story. GUI 800 further includes a story manuscript window 821 depicting a manuscript or outline, which may also include text to be presented to a user (such as a parent) via story guide 150, either as a prompt to facilitate storytelling or as text to be read by the user. In this example, a story manuscript is shown with markers added to indicate when various story elements (e.g., video and audio media files in this example) should be played. Other markers may be added to indicate locations where story branching, scene transitions, logic, etc., are included or locations where such elements might be included at the time of story assembly or storytelling by storytelling engine 160, in one embodiment.

In this way, both the story blocks and the coded story representation can include placeholders for populating with story elements (including characters, settings, story logic, etc.), including in some cases optional placeholders where storytelling engine 160 may insert content based on other conditions being satisfied. For example, in one embodiment, if at or near storytelling time story logic determines that a child-user's bedtime is soon, a shorter version of a particular story may be assembled (by storytelling engine 160) and presented, which may leave out extended sound effects, video or motions, or non-essential story blocks. Similarly, where it is determined that the user desires to fill a longer time period (for example, on a rainy Saturday afternoon), then a longer version of the particular story can be assembled and presented, which includes extended content (e.g., scenes, sound effects, videos, other story threads or blocks, etc.)

Accordingly, GUI 800 provides one way for a producer to input story element descriptions, define associations between story elements, run a simulation of the story experience (for example, story paths, timing, appearance or exit of various media elements, etc.) and then export the story experience into a coded story representation (such as a script or recipe, in one embodiment), in a machine-readable format compatible with the storytelling platform 110. In some embodiments, production component 180 might also include functionality for formatting various media elements and story resources to best fit or operate with presentation component(s) 130, in particular where presentation component(s) 130 includes an omnidirectional display. For example, production component 180 may modify video files to fit a 360 degree display format.

In some embodiments, story elements, such as user-augmented content, can be introduced to Narratarium via visual images, physical objects, such as via 2D or 3D scans or images, music/song/audio, sensing of emotional or physical states of the participants, existing books/stories, etc., which may be received through sensor(s) 145 and/or user interface 155. Story element themes may also include current time/location/physical environment, historical information, factual data, and cultural personas of characters. In some embodiments, a less intelligent system may accept manual choices for the users to make themselves, while a more intelligent or later generation system may infer these choices.

Turning back to FIG. 1B, one example embodiment of a storytelling platform 110 is provided. Storytelling platform 110 generally includes functionality for providing an immersive dynamic storytelling experience. Example embodiments of storytelling platform 110 in FIG. 1B include, among other components, an operating system 112, knowledge representation component 115, ASR component 175, environmental model generator 140, projection distortion correction component 135, storytelling engine 160, and story guide component 150. Embodiments of storytelling platform 110 may be implemented using one or more computing devices such as computing device 900 described in FIG. 9.

Operating system 112 may be implemented as a local or distributed operating system and, in one embodiment, operates in the cloud as a distributed system on a virtualization layer within one or more computer systems such as computing device 900 of FIG. 9. In one embodiment, operating system 112, in addition to providing typical operating system services, is further capable of hosting a number of software or firmware services, which may include other components (or aspects of other components) of storytelling platform 110. By way of example and not limitation, such services might include an automatic speech recognition (ASR) service, a projection distortion correction service, and logic engine or artificial intelligence engine.

In an embodiment, operating system 112 comprises a multi-agent system (M.A.S.) wherein agents carry out services or functions associated with components of storytelling platform 110. In an embodiment, operating system 112 includes an artificial intelligence (AI) engine or framework, which may be used in conjunction with knowledge representation system 115. For example, in one embodiment, the Open Mind Common Sense (OMCS) is used with the ConceptNet knowledge representation system. In one embodiment, operating system 112 includes the open source AI framework OpenCog. Knowledge representation system 115 generally provides semantic relationship information for use by storytelling platform 110 (such as ASR component 115 or storytelling engine 160, in particular) for understanding spoken concepts or for determining appropriate story elements from the resources library. For example, one embodiment uses OMCS and the ConceptNet knowledge representation to infer thematic associations with freeform spoken text (e.g., for a user telling a story about a penguin, a suitable setting for a penguin is determined as the arctic and not the desert; penguins eat fish, so fish might be determined to appear in the story; and other suitable story elements to show include icebergs, for example).

Projection distortion correction component 135 is generally responsible for modifying visual content presented via presentation component(s) 130 in order to compensate for features of the presentation environment. For example, such features could include physical objects in the presentation environment including variations in surfaces (e.g., walls, ceiling, floor, or other object surfaces), orientations, dimensions, relative proximity to presentation component 130, or the like. In this manner, presentation component(s) 130 may provide a consistent presentation of visual content among varying surfaces (e.g., surfaces having dissimilar orientation or unequal distances from the presentation component 130).

In particular, omnidirectional projection on the walls and ceiling (for example) of a presentation environment (such as a child's room) typically introduces geometric distortions due to the shape of the environment. Therefore, some embodiments of Narratarium include geometric transformation functionality for content presented via presentation component(s) 130. Such functionality may be embodied as a software or firmware service, for correcting the distortions before projection using standard mathematical techniques. In some embodiments, projection distortion correction component 135 determines the degree or type(s) of correction to apply based on information about the presentation environment, which may be in the form of a presentation environmental model. For example, as further described in connection to the environmental model generator 140, the presentation environment may be learned (using training component 142) based on user-provided information and/or one or more optical, audio, or other sensors 145, which may occur during a one-time initialization. As further described below, some embodiments may learn of other objects present in the presentation environment (e.g., windows, doors, furniture, etc.) and their position with respect to presentation component(s) 130 through one or more sensors 145 and an image recognition service (which may be employed via a feature extraction component 144, as described below).

Environmental model generator 140 (sometimes referred to herein as "generator 140") is generally responsible for determining a model of the presentation environment and providing the model to storytelling engine 160. In particular, based on a presentation environmental model generated by environmental model generator 140, storytelling engine 160 may modify aspects of the story (such as story elements or story blocks) to incorporate real objects in the presentation environment into the story presented to the user. In one embodiment, an environmental model comprises a set of information indicating identified objects in the presentation environment and information relating to (or corresponding to) the objects such as position, location, size, color, or other features of the object(s). By way of example and not limitation, objects include surfaces for reflecting projected presentation content (e.g., walls, ceiling, floor, and surfaces of physical objects in the environment), physical objects such as furniture or appliances, toys, or other physical objects typically found in a bedroom or living room, or features of the environment such as doorways, windows, and corners. In an embodiment, an environmental model comprises information indicating which portions of an environment, with respect to a presentation component 130, are unobstructed and which portions are obstructed, such that content may be displayed in an optimal location (see, e.g., FIGS. 4A-4C described below).

In one embodiment, environmental model generator 140 includes a training component 142, a feature extraction component 144, and a mapping component 146. Training component 142 is generally responsible for training an environmental model to include specific information about a particular presentation environment. For example, training component 142 may include functionality for surveying or imaging (including depth imaging) a presentation environment and may use one or more presentation environment sensors 145. In one embodiment, training component 142 projects a uniform grid onto the presentation environment, such that distortions in the projected grid (due to objects present in the presentation environment and/or the proximity and orientation of walls or other surfaces) may be analyzed by feature extraction component 144 to learn about the presentation environment.

Feature extraction component 144 is generally responsible for identifying presentation-environment features (and in some cases ultimately recognizing or classifying objects) from information received via training component 142. For example, in an embodiment, feature extraction component 144 determines the orientation and proximity of walls with respect to a presentation component, so that projection distortion correction may be employed (by projection distortion correction component 135) to provide a consistent presentation of visual content among surfaces that have dissimilar orientation or unequal distances from a presentation component 130. In one embodiment, feature extraction component 144 identifies likely windows, corners, doorways, and/or other objects in the presentation environment using pattern recognition or a similar image classification technique.

Mapping component 146 is generally responsible for mapping objects (including features) identified by feature extraction component 144 to physical locations within an environmental model, such that the model provides information indicating locations, orientation, relative proximity, or similar information about the objects and features in the presentation environment with respect to other objects or a common reference location, which may be the location of a particular sensor 145. Mapping component 146 may specify locations of objects, motion paths, actual objects for projected content to interact with (e.g., projected content may rest on actual objects, avoid colliding with actual objects, or simply be positioned to avoid actual objects in the presentation environment, such as shown in FIG. 4C). In one embodiment, mapping component 146 tags or labels identified features in an environmental model (such as windows, doorways, corners, or other objects), thereby enabling the tag or label information to be used to modify presentation of a story based on the presentation environment. Accordingly, an environmental model generated by generator 140 may provide information about objects that are present in the presentation environment and the locations, dimensions, orientations, etc., of the objects. In this way, storytelling engine 160, using an environmental model, may alter content to include objects in the presentation environment; for example, a bird may appear as though entering the presentation environment (e.g., a child's bedroom) through an actual window. Further, in some embodiments, a projection distortion correction component 135 is used with the environmental model to alter content projected via presentation component(s) 130 to provide a consistent presentation of visual content among varying surfaces (e.g., surfaces having dissimilar orientation or unequal distances from a presentation component 130).

Turning briefly to FIGS. 4A-4E, examples of determining content placement based on presentation environment information, such as may be provided from an environmental model created by generator 140, are illustratively provided. When projecting video and images in a presentation environment, it is difficult to anticipate the placement of physical objects like windows, doors, furniture, and even human occupants. Accordingly, some embodiments include functionality for allowing visual story content (e.g., videos and image) to be placed or projected in a more optimal location within the presentation environment.

With reference to FIGS. 4A-4C, and initially FIG. 4A, an example presentation environment 400 is shown, which comprises a bedroom. Presentation environment 400 includes one embodiment for a mapping device 440 for facilitating mapping of a presentation environment. In one embodiment, mapping device 440 comprises one or more sensors 145 for providing information to a training component 142 of environmental model generator 140 and may be part of a presentation component 130. In this example, mapping device 440 is shown resting on a table in the presentation environment 400.

In FIG. 4B, mapping device 440 is shown projecting a known pattern 442 onto one or more surfaces in presentation environment 400. In an embodiment, the known pattern 442 may be projected using a presentation component 130, in particular, in embodiments wherein mapping device 440 and a presentation component 130 are physically housed together. Such an embodiment may be advantageous because distortions introduced by the presentation component 130 may also be corrected (rather than distortions only due to the varied surfaces of the presentation environment). In an embodiment, known pattern 442 comprises a uniform grid, which may be projected omnidirectionally or in multiple directions.

While the known pattern 442 is projected, one or more sensors 145, such as a camera, may be used to capture an image of the projected pattern. In an embodiment, this information is provided to training component 142 of the environmental model generator 140. Based on differences between the known pattern 442 and the captured image of the pattern projected onto the presentation environment, information about the presentation environment, including its effect on distorting the known pattern, may be determined. Accordingly, deformation information for the particular presentation environment may be determined (which may be in the form of an environmental model or may be contained in an environmental model) and used to modify the projected image to create a "corrected" image when seen from within the room. For example, in one embodiment, the projected pattern is modified until the difference (as detected from one or more sensors 145, such as a camera) between the projected pattern and the known pattern 442 (the difference representing the distortion) is minimized, thereby training the environmental model. In this example, it is determined that an object 443 (a dresser) is present in the presentation environment because the pattern is distorted upon projection onto the surface of object 443.

In some embodiments, the learned deformation information may also be used as a guide for placement of content. For example, a key story element would not be placed on a piece of furniture or over a window as it would be difficult to see that content. Turning to FIG. 4C, projected content 455 is shown presented in an optimal location in the presentation environment (e.g., the raccoon and tree are shown presented on a blank wall and not over the pictures or dresser on the right-hand side of the room). In one embodiment, storytelling engine 160 uses laying for presenting story content, in a manner similar to the way graphics programs use laying of images, such that various elements may be presented on different layers and in different positions with respect to other presented elements and objects in the presentation environment. For example, in one instance, the raccoon shown on the middle tree limb might be presented as positioned on the left or right tree limb, because the raccoon image is on a different layer than the tree image. (In other words, the tree and raccoon are not a single static image but are comprised of layers of objects that can be modified as needed.)

Figure 4D:
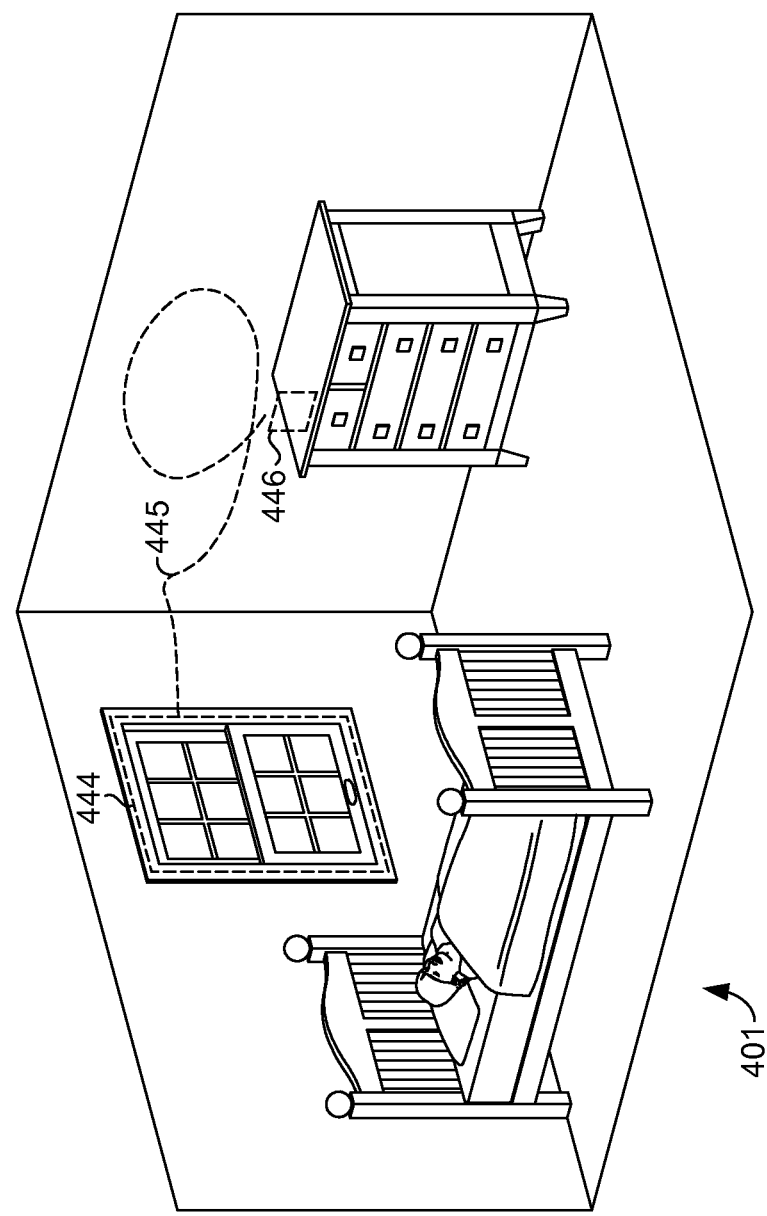
Figure 4E:
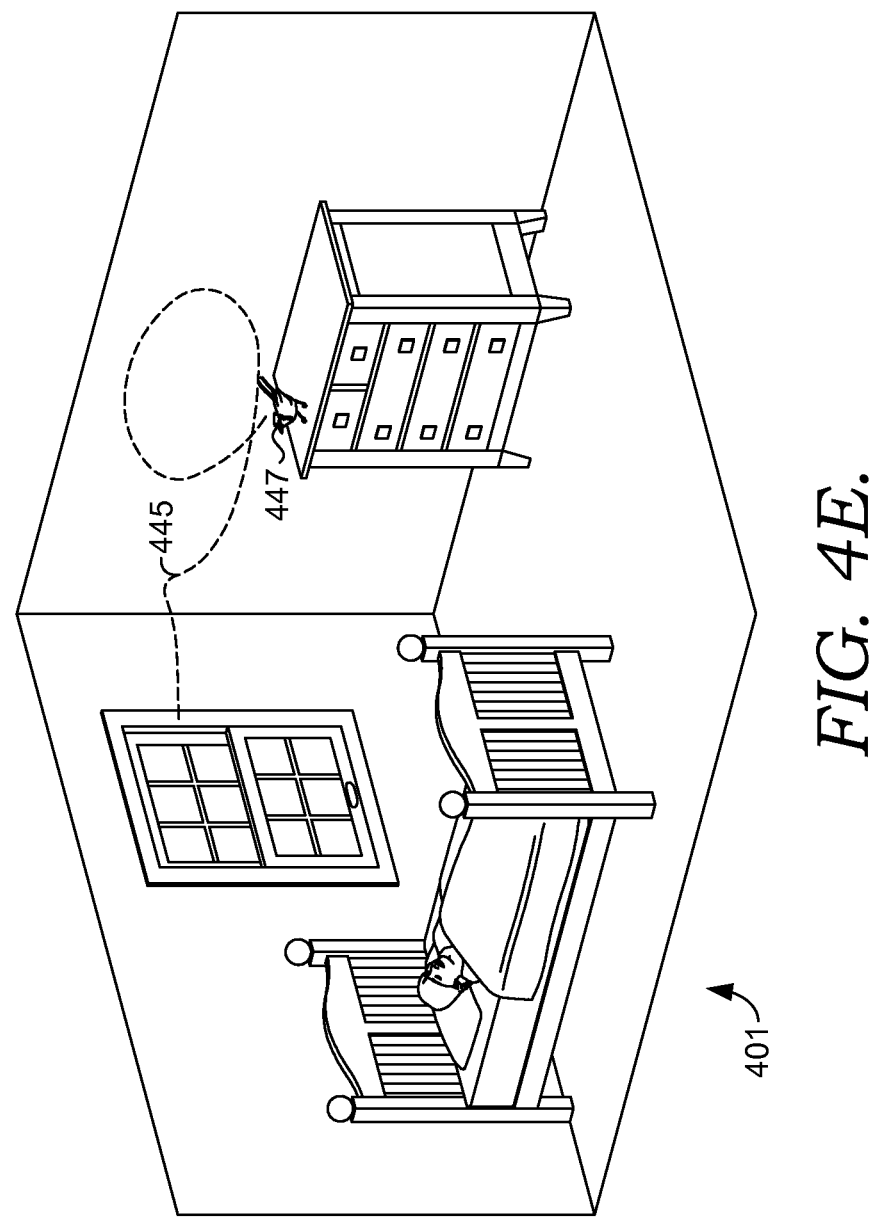

Turning to FIGS. 4D and 4E, based on information from a presentation environmental model, a key story element might be modified to interact with detected physical objects within the presentation environment. For example, a projected character could be placed to appear on a table and then walk to the edge of the table and jump to the floor. FIGS. 4D and 4E show an example presentation environment 401 that includes a window and a dresser. With reference to FIG. 4D, from a presentation environmental model determined from generator 140, a window object 444 may be identified (based on feature extraction and mapping) and a motion path 445 may be optimally determined for a character (story element) to enter from the actual window and come to rest at a location (a placeholder) 446 on the dresser. As shown in FIG. 4D, the particular character has not been determined and a placeholder is used. In one embodiment, mapping component 146 maps to the environmental model any identified objects such as window 444, motion paths 445, and/or interaction-locations of physical objects (such as location 446). Turning to FIG. 4E, at or near storytelling time, storytelling engine 160 may populate the character placeholder with an actual story character (or other story element), such as the blue bird 447 shown here. In this way, the appearance is provided of the bird flying into the presentation environment (e.g., the user's bedroom) through an actual window and landing on the user's actual dresser. Accordingly, embodiments of the storytelling platform 110 provide functionality for allowing projected content to interact with physical space and objects in the presentation environment. Moreover, embodiments of this functionality may be used not only in storytelling systems but also game systems and other content display systems. In an alternate embodiment, a story element may be projected on top of a detected object. For example, an image of a tree stump or a large boulder may be projected onto the dresser to turn the dresser into an element in the story. In this embodiment, when the bird 447 flies in and lands on the dresser, it appears to fly in and land on a tree stump or boulder in the story scene.

Returning to FIG. 1B, example storytelling platform 110 includes story guide component 150. Story guide 150 is generally responsible for assisting a user in telling (or otherwise revealing) a story, a portion of a story, or story content. In an embodiment, story guide 150 includes functionality for prompting a user (as the storyteller) for information that may be used to determine the particular story elements incorporated into the story or determine a branch and story line (or probability of a future sequence of story blocks), and may operate in conjunction with storytelling engine 160, user interface 155, and/or ASR 175. For example, a parent may be prompted to select (via a user interface 155), speak, or otherwise introduce into a story characters, settings, plot choices, or other story elements, as the story unfolds.

Some embodiments of story guide 150 use an AI engine of operating system 112 and knowledge representation component 115 in conjunction with one or more sensor(s) 145 to first determine a level of assistance needed by a storyteller. In an embodiment, a level of assistance may be determined based at least in part on the cadence of the storyteller (e.g., smooth storytelling or uneven pauses) or the internal consistency of story elements introduced by the storyteller. For example, a degree of internal consistency may be determined by determining a degree of relation among story elements (e.g., characters, settings, themes, etc.) introduced by the storyteller using a semantic knowledge representation system (such as determining distances of nodes (as story elements) on a knowledge graph), the degree that the story matches predetermined patterns of story lines or likely sequences of story blocks, or whether the names and types of characters and the settings are the same or changing (such as where a character starts out in one setting and is suddenly in another setting without transition or explanation). A level of assistance may also be determined based on a user preference from user information 129. For example, a user-determined setting might indicate a level of assistance that the user desires.

Based on the determined level of assistance, a level of guidance may be offered to the user. For example, where it is determined that the user needs a higher level of assistance, the user may be prompted more often with choices or suggestions to guide the story's development. In some embodiments, story guide 150 may simply provide a narrative for the user-storyteller to read or may tell a story and prompt the user to make choices for influencing the story. For example, the user may be queried (via user interface 155) at appropriate times about the setting, the type of protagonist and his or her name, and choices the protagonist makes in the story. The user-provided information may be stored in storage 120 and used by storytelling engine 160 to assemble or modify a story (e.g., by populating placeholders in story blocks or threads, presentation environmental models, assembling particular story blocks and/or threads, including determining likely future sequences).

Story guide 150, operating in conjunction with storytelling engine 160 and sensor(s) 145, may also provide guidance more subtly than querying the user via a prompt, by detecting user reaction (e.g., gestures, motions, spoken utterances, user attention) to particular story elements, such as described previously with the example of a firefly. (Upon detecting a user's touching or gesturing towards the projected image of a firefly, a different story thread, which may incorporate the firefly, may be used for continuing the story presentation.)

In some embodiments, story guide 150 provides guidance based on story logic 127. In particular, guidance may be provided to influence story duration or the story's level of excitement, as described previously. Specific guidance and appropriate times for providing guidance, including when to solicit user information, can be determined based on information in a coded story representation, in some embodiments, based on placeholders in story blocks or environmental models to be populated, or based on story logic 127 and information provided by sensor(s) 145 (such as a perceived confusion by a user-storyteller or lack of interest by a child-user).

At a high level, a goal of story guide 150 is to assist the storyteller in order to provide a more complete story experience. A common problem with storytelling is that many people are not skilled storytellers (e.g., their stories are internally inconsistent, omit necessary details, do not follow a standard story structure, etc.). This causes listeners to become confused or lose interest. Some embodiments of story guide 150 therefore provide a solution to this problem by closing the loop between story and the storyteller-user to bring, for example, unknown features and story paths into the story experience by prompting or otherwise guiding the user along the story and introducing new story features and story characters.

As previously described, a storyteller may be prompted or otherwise guided by story guide 150 as he or she is telling the story, in some embodiments. For example, the storyteller may be presented with choices about which characters or plotlines to use, or may be provided with cues of characters, plotlines, or other story elements, which the storyteller selects. In this way and in these particular embodiments, the storyteller simply continues telling the story based on the provided cues. Story guide 150 (via sensor(s) 145 or user interface 155) determines the particular cues selected by the storyteller (or otherwise detects the attention of a user, such as in the example with the firefly) and incorporates (via storytelling engine 160) the corresponding story elements into the story. Furthermore, in some embodiments, a child's (or listener's) favorite story elements (which may be determined based on user-provided information or how often those elements occur in stories) may be stored in user information 129. In these embodiments, story guide 150 might prompt the storyteller about whether to include those favorite story elements. Similarly, the story guide 150 may determine story elements that have not been used before or have not been used recently and provide those story elements to the storyteller (or directly to storytelling engine 160) in order to create a new story experience.

In some embodiments, story guide 150 includes a prompting service, such that through story guide 150, a user may provide information used for tailoring a story in response to a prompt by simply reading a cue, responding to a question or prompt, asking a question, or moving (e.g., pointing to an object or image) or touching an object or image. By way of example and not limitation, other ways for receiving user responses to prompts provided by story guide 150 include physical sensors for detecting voice (speech), audio, light, time, temperature, location, and movement through, but not limited to, accelerometers, light sensors, voice recognition, clock circuit, and heat sensors.

In one embodiment, story guide 150 is provided through a third-party agent, which may be an actual person (e.g., a parent or grandparent), to whom the story guide cues are provided. For example, the storyteller (who may be located in a different location than the presentation environment) may use an app on a mobile device that is communicatively coupled to a Narratarium session in the presentation environment for displaying story cues, choices, suggestions, or other guidance. In some cases, a storyteller can specify other parameters relating to the level of assistance desired, story elements to use (or to avoid), specific story elements and characteristics (e.g., story length, pace, excitement level, etc.), or other user preferences. In one embodiment, a remotely located storyteller tells the story by speaking into a mobile device running an app, whereupon a listener (such as a child) located in the presentation environment hears the storyteller's voice coming from the Narratarium and is presented with corresponding story content.

In another embodiment, the third-party agent guide takes the form of a virtual character in the story, which may interact with the user or storyteller in order to guide the story, or takes the form of an object or toy, which may be real or virtual. In one embodiment of story guide 150, a software service, which may be embodied as a software agent, runs during the story presentation and determines, based on cues (e.g., cadence, long pauses, internal consistency, etc.) provided by the storyteller, a level of assistance to provide the storyteller. The software agent may be part of an artificial intelligence component of operating system 112, as described previously. In one embodiment, the agent comprises a virtual assistant that may be summoned by the storyteller at any time to suggest story paths, characters, challenges, solutions, or provide other guidance. The assistant might appear in the presentation environment or on user interface 155, which may be a remote screen, such as the screen of the storyteller's mobile device running the app, as described above. Furthermore, in some embodiments, the virtual assistant is tailored to the storyteller or listener, for example, accounting for age and ability to interact.

In this way, some embodiments of story guide 150 facilitate the pace and emotional flow (e.g., highlighted or subdued) of a story and its duration. Some embodiments of story guide 150 can also provide choices such as options on story paths, based on knowledge representation component 115 and information from storytelling engine 160, and further provide suggestions to a storyteller based on choices that the storyteller makes to ensure that a story makes sense for smaller children. Some embodiments of story guide 150 can also provide sub-interactivity, such as by calling out characters or features in the story that should receive more attention from the listener, such as by highlighting interactive portions of a scene or controlling the actions of a story character or environment to draw attention to or introduce a new story path. For example, individual characters or objects in the story may change state (e.g., from static to movement), which might indicate they have something to add to the story or to prompt story paths. Similarly, using the firefly example described previously, a firefly entering the scene and landing on the rooftop of one house in a village might prompt the user to touch the house, ask about the house, or otherwise say something about the firefly or the house, leading the storytelling engine 160 to modify the story based on the user's response to the firefly. Similar examples of state changes might include color, sound, size, etc., and may even appear random to the user, even though they are managed by story guide 150 working in conjunction with storytelling engine 160.

Turning briefly to FIGS. 5A through 5D, several examples of guidance provided by a story guide 150 are shown. FIGS. 5A and 5B show example user interfaces 501 and 502 (which may be embodied as user interface 155 of FIG. 1A) presented on a user device 555, such as a tablet computer, used by the storyteller during a storytelling session of Narratarium. In the example embodiments shown in FIGS. 5A and 5B, the user interface indicates that a story guide is running, displays the current time and other information, such as a child's bedtime. User interface 501 also shows examples of prompts provided to a user-storyteller by an embodiment of story guide 150. In this case, a previous query 517 asked the user question 518 ("Where does Liz live?") and received response 519 ("Cambridge"). User interface 501 is presently displaying prompt 521, which queries the user regarding what kind of animal Liz is. Prompt 521 provides several suggestions 522 including a pony, giraffe, bird, and butterfly.

User interface 502 in FIG. 5B shows other examples of guidance provided by story guide 150, which may be provided later in time than the guidance provided in user interface 501 (as indicated by the change in time from 7:48 pm to 7:53 pm). In particular, user interface 502 provides a suggested narrative 525 to the storyteller for beginning a story. User interface 502 also indicates a story duration 531, which may be in the form of a count-up or count-down timer (shown here), in an embodiment. In one embodiment of story guide 150, a storyteller, such as a parent, may begin telling the story to a child-user, and then before the story has ended, transition the storytelling to storytelling platform 110, such that the parent may leave the presentation environment while the child-user is presented the remainder of the story until the child falls asleep or the story ends. In other words, the parent starts telling the story and hands-off the storytelling to an embodiment of the Narratarium, which completes the storytelling.

Figure 5D:
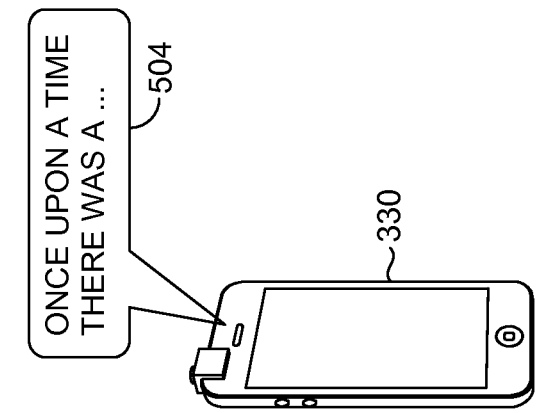
Figure 5C:
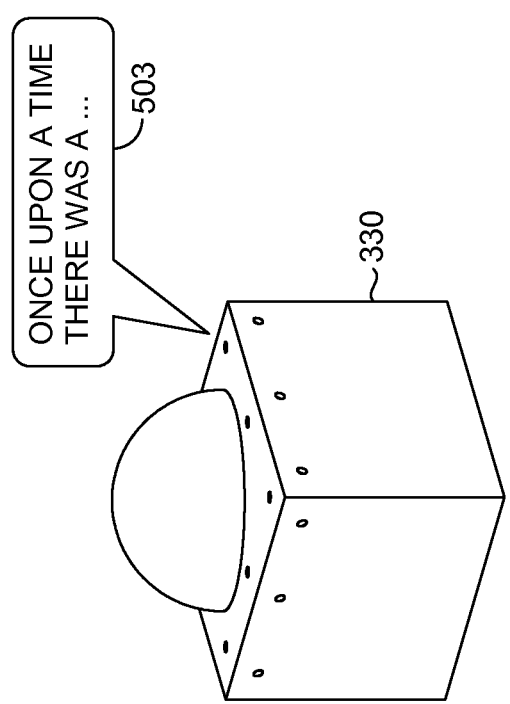

FIGS. 5C and 5D show examples of storytelling guidance provided by speakers in presentation components 330. In this example, a story narrative (shown as items 503 and 504, respectively) is told from speakers in presentation components 330. The source of the sound may originate from a remotely located storyteller, such as described above, from a recording made from a storyteller (e.g., a parent pre-records a story), or may be a voice generated by an embodiment of storytelling platform 110 for speaking the story (or portions of the story) to a user.

Returning to FIG. 1B, example storytelling platform 110 also includes storytelling engine 160. Storytelling engine 160 is generally responsible for providing functionality for assembling, evaluating, and/or modifying aspects of a story for presentation to a user, which may occur in near real time as the story is presented, including story elements presented via presentation component(s) 130, story plot(s), themes, interactions, excitement level, or other content or story elements. Embodiments of storytelling engine 160, operating in conjunction with other aspects of system 100, may assemble, evaluate, and/or modify a story based on user-provided information, environmental and contextual information, and story resources and story logic. In one embodiment, storytelling engine 160 functions as a primary control structure for a Narratarium.

By way of background, it is socially relevant to tell bedtime stories to children or amongst family members. Storytelling also represents a heightened emotional connection between parent and child. But a common problem with storytelling is that many people are not skilled storytellers (e.g., their stories are internally inconsistent, omit necessary details, do not follow a standard story structure, etc.). This causes listeners to become confused or lose interest. Bedtime storytelling introduces additional challenges including timing of the story, so that the child gets to sleep in a reasonable amount of time; and calming the child to prepare for sleep, including when the parent-storyteller is traveling or remotely located and the child has separation anxiety.

Accordingly, some embodiments of storytelling engine 160 provide a solution to these challenges by guiding and prompting the user for appropriate story elements (via a story guide 150) and assembling the elements into a story. Specifically, some embodiments of storytelling engine 160 utilize a modular and non-linear story structure (such as the example story structures described in connection to FIGS. 6A-6C), thereby enabling stories to be dynamically modified in terms of story elements, including pace, length, emotional intensity, characters, plot, corresponding imagery and sounds, etc. Additionally, some embodiments of storytelling engine 160 are capable of modifying the story experience (including real-time changes) to keep a child-user (or audience) appropriately engaged for a suitable length of time, such as after the parent leaves the room and/or until the child-user falls asleep.

Continuing with FIG. 1B, an example embodiment of storytelling engine 160 is provided and includes an assembler 162, an evaluator 164, and a modifier 166. Example storytelling engine 160 may operate with operating system 112 and knowledge representation component 115. Assembler 162 is generally responsible for assembling a story for presentation. Embodiments of assembler 162 can assemble a story based on user-provided information (which may be obtained via story guide 150), environmental and contextual information, available story resources and story logic (including logic associated with user information 129 such as favorite story elements, elements to avoid, frequency of story elements in previously presented stories, bedtime, or other user preferences, user settings, or user history information). In one embodiment, a story may be assembled from story blocks such as described in connection to FIGS. 6A-6C and may be assembled according to a coded story received from a production component 180. In some embodiments, assembler 162 identifies placeholders in a coded story or story blocks and populates the placeholders with appropriate story content, which may be determined, for example, based on metadata provided in the story blocks or instructions or tags in the coded story representation. In some embodiments, storytelling engine 160 calls story guide 150 to receive information from a user in order to determine content for filling a placeholder.

Evaluator 164 is generally responsible for determining whether an assembled story needs to be modified and/or how a story is to be modified. For example, some embodiments of evaluator 164 determine whether and how to modify a story based on story logic 127, information received from a user via story guide 150, presentation environment information (which may be derived from an environmental model determined from generator 140), and/or contextual information, which may be provided, for example and without limitation, from sensor(s) 145, user information 129, or other components of storytelling platform 110. Some embodiments of evaluator 164 also determine to call story guide 150 for receiving information from a user, based on metadata from story blocks, story logic, information received from story guide 150 indicating that a user needs assistance, or information from a coded story, for example. Moreover, some embodiments of storytelling engine 160 further work in conjunction with story guide 150 to provide prompts or guidance to story guide 150 and then incorporate user responses into the story (which may be facilitated by assembler 162 and/or modifier 166).

Modifier 166 is generally responsible for modifying a story, including modifying story content (including, for example, duration and excitement level as well as other story elements), based on information provided by evaluator 164. In some embodiments, modifier 166 operates with assembler 162 to reassemble a story. In some embodiments, modifier 166 alters (or updates) the weightings associated with the connections between story blocks in a story structure having a sequence of story blocks, such as described in FIG. 6C. In these embodiments, assembler 162 may then determine a subsequent story block based on the updated probabilities associated with the current block and potential subsequent blocks. This may occur in near real time, in some embodiments.

As described previously, some embodiments of storytelling engine 160 operate with operating system 112 and knowledge representation component 115 and may use AI, logical processing functionality, and semantic information provided by these components. In these embodiments, such functionality may be used for selecting and assembling appropriate story elements and, in some cases, generating and/or accepting prompts for the user (story guide 150). Further, some embodiments of storytelling engine 160 may be configured to use story logic to generate story structures to follow or to use predetermined story structures in order to satisfy conditional requirements of story variables or parameters, including length, pace, emotional intensity (i.e., rising and falling action), how to use scenes, characters, themes, plots, etc.

As described in connection to FIGS. 6A-6C, in some embodiments, a story structure includes modules, threads, or blocks, having predetermined entry and exit points, that are usable by storytelling engine 160 to assemble a story and/or modify or reassemble a story, in near real time, as a story is being presented. In some cases, these entry/exit points may be visual, editorial, audio, etc. In particular, individual story pieces or threads, including plotlines and transitions, may be coupled together by an embodiment of storytelling engine 160 based on story parameters, which may be determined from story logic 127, user information 129, or environmental information 123, including duration or available time, desired level of excitement, amount of guidance a storyteller needs, user preferences (such as favorite characters, plots, or other story elements, new (or not recently used) story elements), other user-provided information, contextual information, story block metadata, or information provided from a coded story representation.

In an embodiment, storytelling engine 160 includes functionality for detecting and analyzing information from the storyteller and presentation environment and using that analysis to modify the story. For example, in one embodiment, a user is allowed to specify parameters such as duration or level of excitement before starting the story, which may be provided via a story guide 150. However, it is contemplated that in some embodiments, aspects of storytelling platform 110 (which may use an AI engine of operating system 112, or logic rules) can learn storytelling tendencies of the user. For example, a storytelling session occurring later in the evening on a weeknight may influence storytelling engine 160 to assemble a story of reduced duration and lower excitement level. In one embodiment, story logic 127 (which may be set by a user or provided via story guide 150) specifies a relationship between contextual information, such as time and day, and story duration and/or excitement level. In one embodiment, such contextual information "influences" storytelling engine 160 in that weights or probabilistic relationships between the story blocks are adjusted based on these contextual conditions. For example, the weights may indicate a higher probability for a sequence of blocks that corresponds to a story having a shorter duration and lower excitement level.

Considering the above example, where storytelling platform 110 detects an increase in the typical cadence of the storyteller (which may be detected via story guide 150 and one or more sensor(s) 145), it may be determined that the storyteller is in a hurry to finish the story, and the story may be modified to have a shorter duration. Likewise, where gaps, pauses, or breaks in cadence in the oration of the story are detected (or increasingly frequent utterances such as "ahh" or "ummm" are detected), storytelling platform 110 may infer that the storyteller needs a higher level of assistance, and prompts or guidance may be provided.

In one simplified embodiment, storytelling engine 160 preprogrammed with a story structure, based on a coded story representation, is limited in its capability to react to user-provided information. In another more extended embodiment, however, the storytelling engine 160 uses a more free-flowing story structure that is influenced by a wide range of user-provided, environmental, and contextual information, and further has a much greater capability to interpret and react to those inputs.

For example, as described above, in some embodiments, storytelling platform 110 receives cues from the user and/or the environment, such as verbal cadence, volume level, pauses or lapses, number of distinct voices detected, elapsed story time, illumination level in the room, detection of motion, physical interaction with other objects communicating with the system, for example, and uses that information to assemble, evaluate, or modify a story, such as which story block or thread to use next, which story element(s) to include in the next part of the story, etc. In some embodiments, storytelling engine 160 looks ahead at potential future branches, probable story block sequences, scenes, or use of other story elements in order to make suitable decisions about story assembly, evaluation, and modification.

As described previously, some embodiments of story engine 160 operate with story guide 150 to anticipate a degree of help needed by a storyteller and to assist the storyteller in order to provide a more complete story experience. Using a variety of input information, as described previously, some embodiments of storytelling engine 160 and story guide 150 can determine a storytelling confidence level of the storyteller(s) (or level of guidance needed) and can provide a range of content options based on that comfort level, for example, by prompting or guiding the storyteller. Prompting, which may be facilitated in conjunction with story guide 150, can be accomplished in a number of ways, including visual, audio, and orientation of a projected image or scene, which may be incorporated into an assembled story by modifier 166. In some cases, a cause and effect mechanism, generated by user interaction (voice, motion, etc.) and/or by external objects (e.g., plush, toy, etc.), introduces varying and interesting story turns to hold the attention of the "audience."

In some embodiments, storytelling engine 160 may generate content (including story elements) that are not necessarily real-time experiences. For example, story content may be generated including story documents or outlines, musical song/score, etc. Further, some embodiments of storytelling engine 160, or more generally storytelling platform 110, may learn the likes of the user based on generated content (including story experiences) that the user requests or avoids. Additional aspects of storytelling engine 160 and services performed by storytelling engine 160 are provided throughout this description in connection to other components of storytelling platform 110 or other features of various embodiments of the invention.

With reference now to FIGS. 1A-1C, the components of system 100 may be embodied as a set of compiled computer instructions or functions, program modules, computer software services, or an arrangement of processes carried out on one or more computer systems, such as computing device 900 described in connection to FIG. 9, for example. Further, these components, functions performed by these components, or services carried out by these components may be implemented at appropriate abstraction layer(s) such as the operating system layer, application layer, hardware layer, etc., of the computing system(s). Alternatively, or in addition, the functionality of these components and/or embodiments of the invention described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Figure 2A:
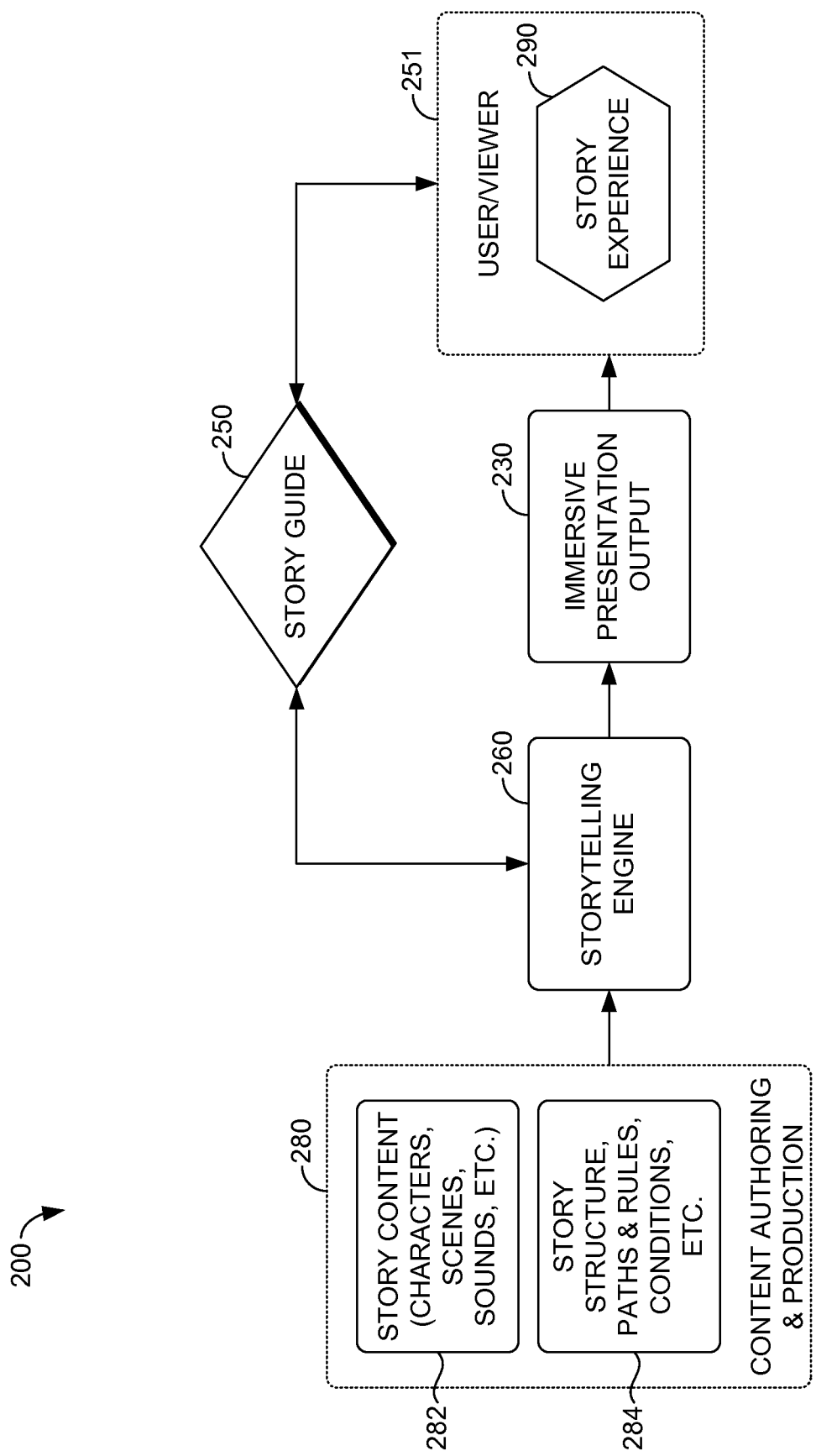
FIGS. 2A and 2B are block diagrams showing aspects for creating an example story experience for a user, in accordance with an embodiment of the invention.
Figure 2B:
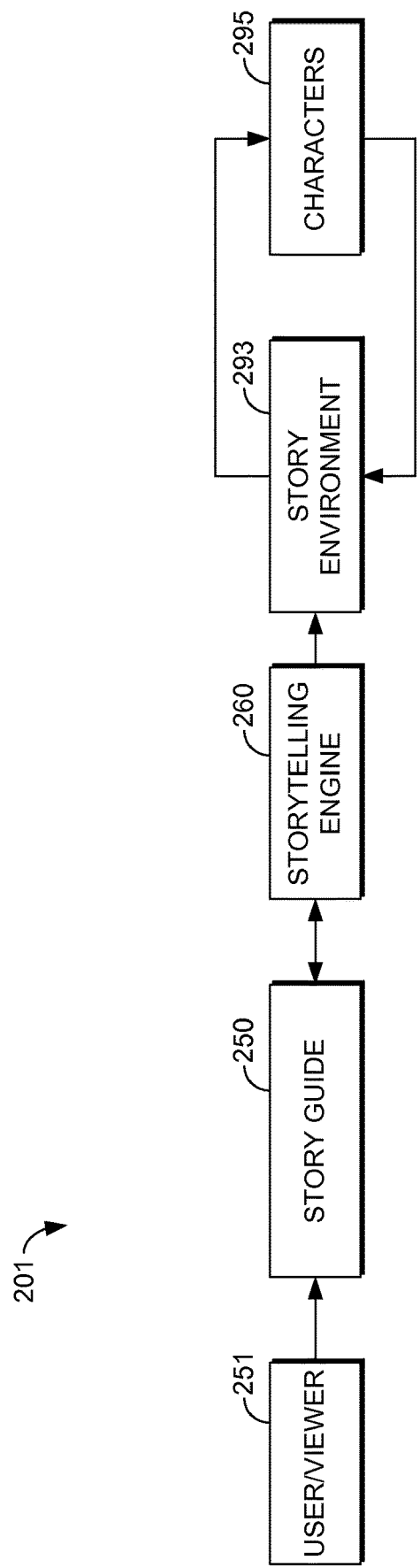

Turning now to FIGS. 2A and 2B, block diagrams are provided showing aspects for creating an example story experience for a user, and referenced as architectures 200 and 201, respectively. Architectures 200 and 201 are intended to illustrate aspects of some example embodiments of Narratarium, and arrows indicate primary information flows, although it is contemplated that information flows both ways. Additionally, for the sake of clarity, some components or features are omitted.

Architecture 200 includes a content authoring and production component 280, which provides another aspect of a production component, such as production component 180 of FIG. 1A; a storytelling engine 260, which may be embodied as storytelling engine 160 of FIG. 1; immersive presentation output component 230, which may be embodied as one or more presentation components 130 of FIG. 1; and story guide 250, which may be embodied as story guide 150 of FIG. 1. Example architecture 200 also shows a user 251 and story experience 290. Production component 280 comprises a story content component 282 and a story structure, paths, and rules component 284. Story content component 282 may include story resources, story elements, story libraries, blocks, etc., such as described previously, and structure, paths, and rules component 284 may include story logic, conditions, rules, structures, etc., such as described previously. The output of production component 280, which may be in the form of a script or coded story representation, for example, is provided to storytelling engine 260. Storytelling engine 260 also receives information from story guide 250, such as user-provided information that may be used for assembling or modifying a story. In some embodiments, an evaluation component (not shown) of story engine 260 provides information to story guide 250 for querying a user or guiding a user to facilitate storytelling. Storytelling engine 250 outputs computer instructions to immersive presentation output component 230 for presenting story content, as the story is being told, presented, or otherwise provided to user 251, thereby creating an immersive story experience 290.

With reference to FIG. 2B, architecture 201 includes some of the same components as architecture 200 but also shows story environment 293 and characters 295. In some embodiments of storytelling engine 260, a user is not in control of the story characters or other story elements directly but may influence the story elements through the story environment. For example, this influence may be administered through a third-party agent, as described previously, via spoken word, physical gesture, and/or other viewer inputs. Accordingly, architecture 201 illustrates a relationship between the story guide 250 and storytelling engine 260. By including functionality for two taxonomies (one for characters 295 and one for story environment 293), interaction between these two components creates a state change system where changes will create unforeseen results. Some embodiments of storytelling engine 260 are programmed to balance the interactions. In particular, the amount of balance may drive the story and create interesting twists and turns. In some embodiments, this balance can be controlled by storytelling engine 260 or by the user through a user interface (such as user interface 155), through sensory inputs, user preferences, external objects, etc.

In some embodiments of architecture 200 or 201 of FIGS. 2A and 2B, the story guide comprises a library of guideposts and corresponding guidepost commands. In particular, a user may "guide" one or more story characters through a story using a short series of guidepost commands, wherein each command may correspond to a stage in the story's plot. In an embodiment, the guidepost commands are used in conjunction with a book, such as a durable bound children's book, and further may be understood by the storytelling engine as a type only—no illustrations. For example, when a guidepost command is read aloud from the book, characters are set at the beginning of a point in a predetermined narrative of the story. Further, the length of activity or story occurring between the guidepost commands may be based on a storytelling participant's secondary commands, described below, which may much greater in number than guidepost commands.

As described above, guideposts may mark the progress of plot points in a Narratarium story structure. A participant uses guidepost commands to direct characters to specific plot points in a story's structure. When spoken, characters may be positioned to begin a new section of the story narrative, there to follow its plot and perform secondary activities at the participant's discretion until directed to the next guidepost. Examples of guideposts may include, without limitation: Setup—Introduction of story world and characters in their initial setting; Catalyst—Being, object or event that initiates action toward a goal; Progress—Increase in motivation toward achieving the goal; Obstacle—Complicating factor that builds conflict with the goal; Booster—Extra effort and/or big break makes goal achievable again; Misfortune—New development makes goal appear impossible; Jeopardy—Everything is risked in a last drive to the story's climax; Payoff—The goal is achieved (or not) and the plot is resolved. In some embodiments, guidepost commands are printed (as text) in a book, or may be suggested via prompting the user (such as shown in FIGS. 5A and 5B). Examples of corresponding guidepost commands include, without limitation: "This one time, up in my room . . . " (setup); "When all of a sudden . . . " (catalyst); "So, it was time to get started . . . " (progress); "Just when things were going great . . . " (obstacle); "But there was no turning back . . . " (booster); "Then, from out of nowhere . . . " (misfortune); "There was only one thing left to do . . . " (jeopardy); or "And all was right with the world . . . " (payoff).

Secondary commands may be used to direct characters or other story elements in ways that are not specific to a story's particular plot points. For example, when secondary commands are spoken, characters may respond to these commands with sound, action and interaction at the participant's discretion. In some embodiments, secondary commands can be answers to questions posed by the characters. Examples of secondary commands may include, without limitation: "Sing me a song," "Fly into the tree," "Get bigger," "Turn green."

The following is an example of guideposts and corresponding guidepost commands for story about a monster who will perform a song with direction from the participant. Guideposts include: Setup—A monster arrives in the room environment; Catalyst—The participant asks the monster to sing a song; Progress—The monster refuses; the participant changes conditions to prompt the monster to sing; Obstacle—The monster continues to refuse; Booster—The monster reacts to condition changes in fun, watchable ways; Misfortune—The monster keeps refusing after four condition changes; Jeopardy—The participant reaches the last of the possible condition changes; Payoff—The monster agrees to sing and invites the participant to learn the song. The guidepost commands and (character responses) include: "Hey, Monster!" (setup); "Do you want to sing a song?" (catalyst); "Will you when the sun shines?" etc. (progress); "No." (obstacle); "Achoooo!" (booster); "Noooooooooo!" (misfortune); "Will you under twinkle stars?" (jeopardy); "And all was right with the world . . . " (payoff).

Figure 7A:
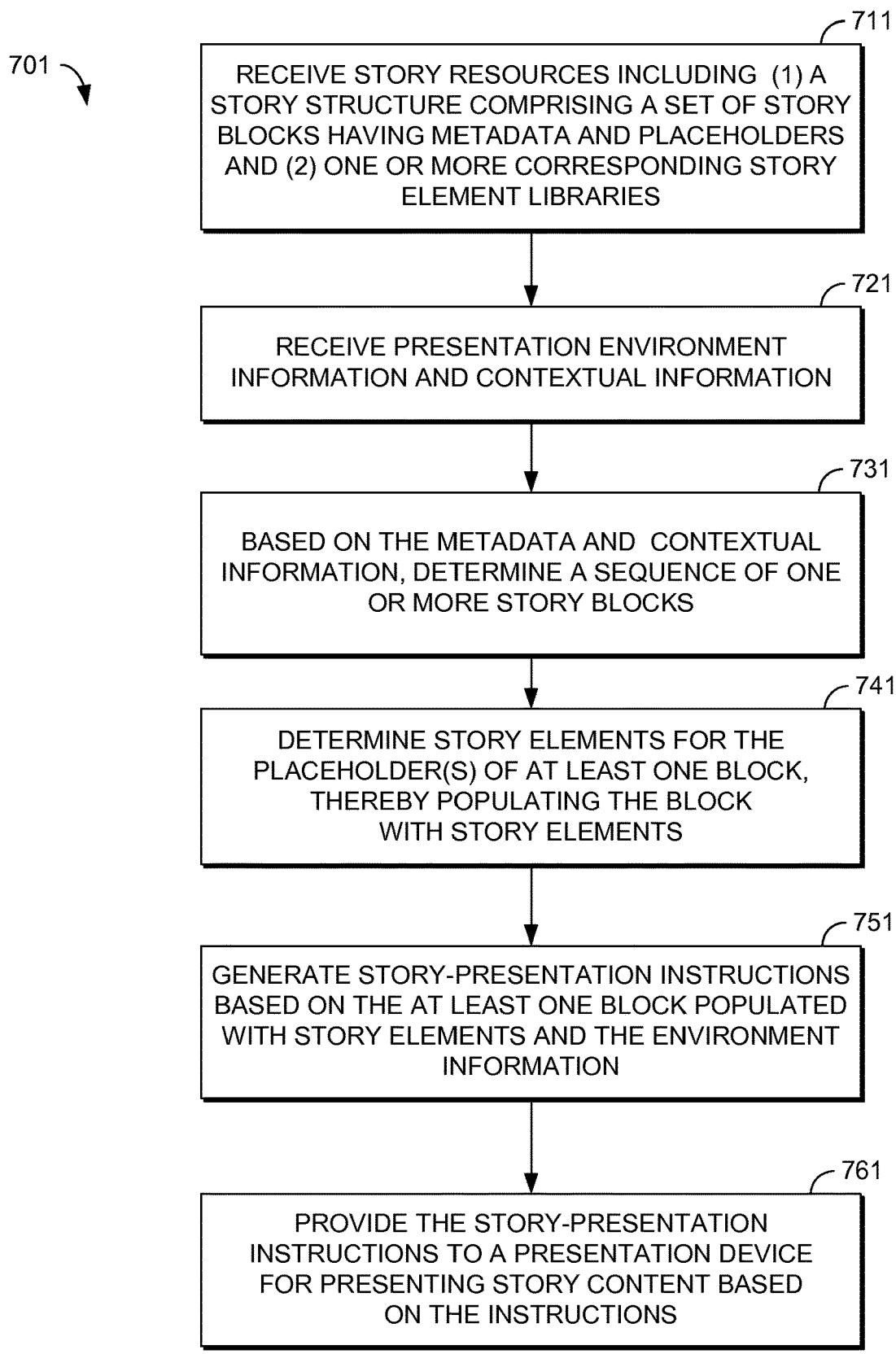
FIG. 7A depicts a flow diagram of a method for providing a dynamic, immersive story experience, in accordance with an embodiment of the invention.

Turning now to FIG. 7A, a flow diagram is provided of a method for providing a dynamic, immersive story experience, and referred to generally as method 701. At step 711, story resources are received, including a story structure comprising a set of story blocks and one or more corresponding story element libraries. In embodiments of method

701, metadata is associated with each block in the set of blocks, and the set of blocks has placeholders for story elements (such as characters, settings, story content, logic, etc.), such as described in connection to FIGS. 6A-6C. In one embodiment, the one or more corresponding story element libraries include story logic, images, sounds, characters, animations, themes, dialog, guidance information, or other story elements related to or compatible with the set of story blocks. At step 721, information about the presentation environment or contextual information is received. In one embodiment, information about the presentation environment is received as a presentation environmental model, which includes information about the presentation environment, such as objects in the environment, their location and/or dimension. In one embodiment, contextual information is received from a user or from user preferences or settings, such as user information 129 in FIG. 1A. For example and without limitation, in one embodiment, contextual information comprises user utterances, user selections in response to prompts or queries (which may be received via a user interface, gesture, motion, utterance, or action), a user's favorite story elements, or story element that have not been used recently.

At step 731, a sequence of one or more story blocks is determined based on the metadata of the blocks and contextual information. In one embodiment, the sequence of blocks will determine the flow of the story (e.g., scenes, interactions, dialogs, etc.), such as described in connection to FIGS. 6A-6C. In one embodiment, the sequence includes branches or threads of block sequences; thus, although the term sequence is used, it is not intended to be construed so as to include only strictly serial ordering of blocks (i.e., one after another without branches, like train cars on a train). In one embodiment, block metadata is used for determining a sequence.

At step 741, story elements for the placeholders of at least one block in the sequence of blocks are determined, thereby populating the block with one or more story elements. In particular, embodiments of step 741 determine story elements to fill the placeholders in one or more of the blocks. In some embodiments, the earlier occurring blocks in the sequence will be populated with story content first. In some embodiments, later blocks will be populated with story content as they are processed (by storytelling engine 150) or as conditions are satisfied which specify how the placeholders are to be populated. (For example, a user selection in response to a prompt presented in the middle of a story may introduce a new story element that will be populated in that block and subsequent blocks but does not need to be populated until near the introduction of the story element. In other words, placeholders in the later occurring blocks of the sequence do not need to be filled until the blocks with those placeholders are being processed by the storytelling engine.) In some embodiments, step 741 determines story elements for the placeholders based on information received from a user, and further in some embodiments, that information is received in response to presenting a prompt to the user soliciting (e.g., querying) the information, such as described in connection to FIGS. 5A and 5B.

At step 751, story-presentation instructions are generated based on at least one populated story block and the presentation environment information. In embodiments, the story-presentation instructions include computer instructions specifying the presentation of story content using a presentation component 130. At step 761, the story-presentation instructions are provided to a presentation device for presenting story content based on the instructions. In one embodiment, story content includes visual and audio information, which may correspond to a story as it is being told by a user.

In one embodiment, method 701 further comprises determining an evaluation of the presented story content; based on the evaluation, modifying at least one of a story block or story element populating the block; generating updated story-presentation instructions; and providing the updated story-presentation instructions, which are based on the modification, to a presentation device, thereby modifying the presentation experience. In one embodiment, the evaluation is determined based on information sensed from the presentation environment, which may include information derived from a user's spoken narration of a story such as pauses, rate, cadence, or internal consistency, such as described in connection to FIG. 1B. In one embodiment, the evaluation is based on information provided by a user in response to a prompt, and in one embodiment, the evaluation is determined based on contextual information such as a user's attention level, user utterances, gestures, or actions, time of day, condition or presentation environment.

Figure 7B:
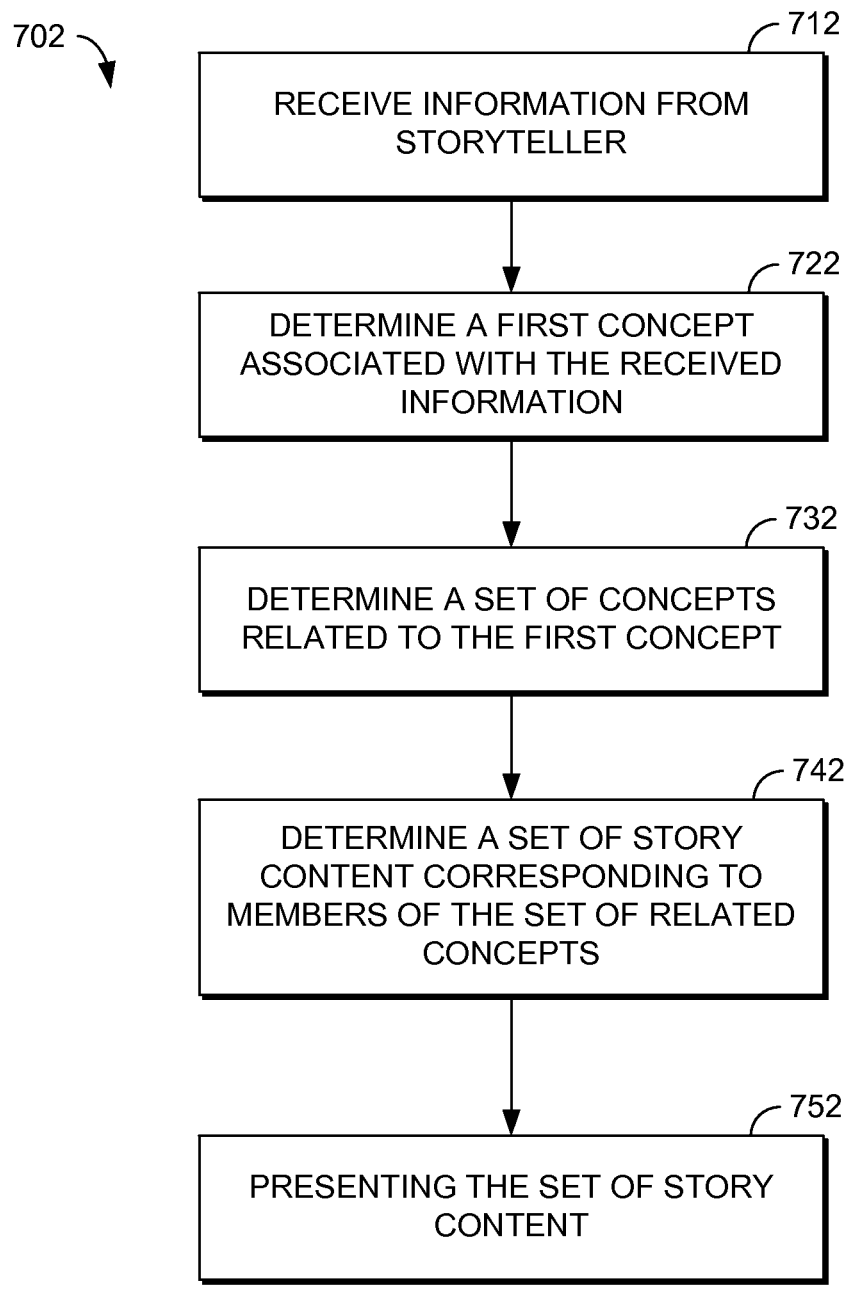
FIG. 7B depicts a flow diagram of a method for providing an immersive story experience, in accordance with an embodiment of the invention.

Turning now to FIG. 7B, a flow diagram is provided of a method for providing an immersive story experience, and is referred to generally as method 702. At step 712, information is received from a storyteller. The information may be received from one or more presentation environment sensor(s) 145. For example, in one embodiment, a storyteller tells a story and audio information representing the storyteller's spoken words is received. In one embodiment, gestures or motions of the storyteller are also received. At step 722, a first concept associated with the received information is determined. In one embodiment, step 722 applies ASR to decode or recognize (via a computing device) words spoken by the storyteller. Then, using a knowledge representation system, a first concept associated with the received information is determined. For example, suppose the storyteller states, "Once upon a time there was a penguin . . . " The output of step 722 may determine the first concept as a "penguin" (or more specifically as computer-readable information indicating a penguin). At step 732, a set of concepts related to the first concept is determined. Some embodiments of step 732 use a knowledge representation system and/or semantic relationship knowledge store (such as a knowledge graph) to determine one or more concepts related to the first concept. For example, from the first concept "penguin," the set of concepts related to penguin may include "ice," "icebergs," "south pole," "cold," "wind," "Antarctic," "fish," "Emperor penguin," "Macaroni penguin," etc.

At step 742, a set of story content corresponding to members of the set of related concepts is determined. In some embodiments of step 742, story element libraries (or story resource libraries) may be searched for story elements matching members of the set of related concepts. In other words, story content comprising images, sounds, animations, settings, etc., corresponding to ice, icebergs, south pole, etc., is determined. In the example above, this story content may include visual and/or audio information of story elements such as a penguin, ice, howling winds, icebergs, water, splashing, etc. In some embodiments, the story content is identified as a character, setting, etc.

At step 752, the story content is presented. Some embodiments of step 752 present story content using story-presentation instructions determined from the story content and interpreted by a presentation component 130, such as described in step 761 of method 701. In some embodiments of method 702, as the storyteller continues to speak, the story content already presented is modified based on additional concepts determined from information received from the storyteller.

Figure 7C:
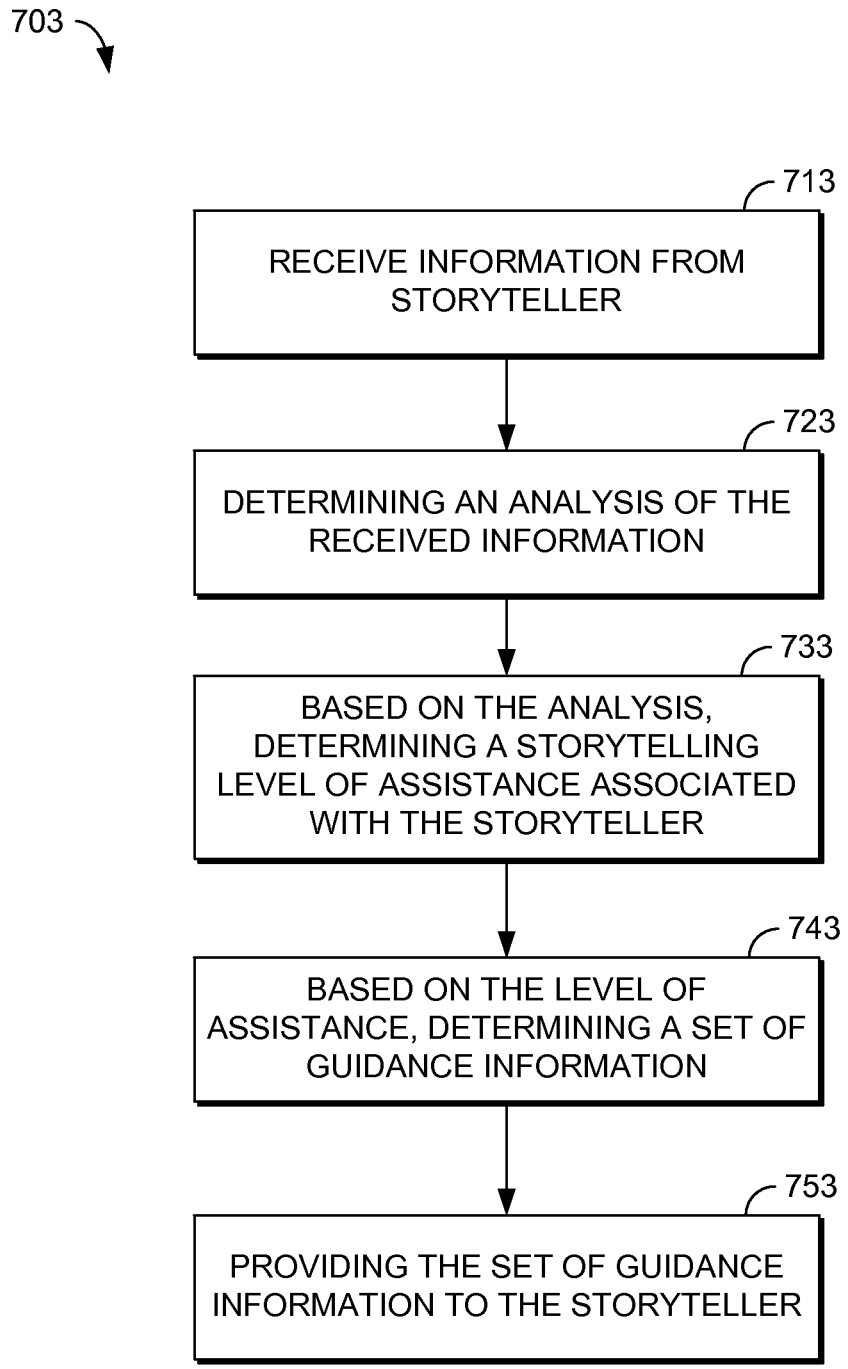
FIG. 7C depicts a flow diagram of a method for providing a story guidance to a storyteller, in accordance with an embodiment of the invention.

Turning now to FIG. 7C, a flow diagram is provided of a method for providing a story guidance to a storyteller, and is referred to generally as method 703. At step 713, information is received from a storyteller. For example, in one embodiment, a storyteller tells a story and audio information representing the storyteller's spoken words is received. In one embodiment, gestures or motions of the storyteller are also received. The information may be received from one or more presentation environment sensor(s) 145. In one embodiment, the information comprises an indication that the storyteller desires assistance.

At step 723, an analysis of the received information is determined. In one embodiment, step 723 applies ASR to decode or recognize (via a computing device) words spoken by the storyteller. In one embodiment, a portion of the information from the storyteller is analyzed to determine a value representing the cadence or frequency of pauses, stutters, or utterances such as "um" or "uh." In one embodiment, a knowledge representation component is used to determine a degree of consistency in the semantic relationship of words spoken by the storyteller. In an embodiment, wherein the information received in step 713 comprises an indication that the user desires assistance, the analysis determined in step 723 comprises the received indication. In another embodiment, step 723 determines a degree of storytelling experience of the storyteller. For example, in one embodiment, user preferences or settings, which may be stored in user information 129, may indicate the degree of storytelling experience of the storyteller (such as a setting like "I am a beginner") or may include user history information such as information from previous storytelling sessions from which a degree of storytelling experience may be determined in step 723.

At step 733, based on the analysis determined in step 723, a level of assistance associated with the storyteller is determined. In an embodiment, the level of assistance is indicated by a number or category (e.g., high, medium, low) and corresponds to a degree of guidance that may be provided to the storyteller. In one embodiment, predetermined thresholds are used for determining a level of assistance, based on the analysis determined in step 723. For example, predetermined thresholds based on the amount of pauses or frequency of utterances comprising "um," "uh," etc., may be used to determine the level of assistance, in one embodiment.

At step 743, based on the level of assistance, a set of guidance information is determined. As described in connection to story guide 150, guidance information can comprise prompts, queries, or suggestions for the storyteller, narration for a story which the storyteller simply reads, or a combination of these, for example. In one embodiment, the suggestions, prompts, queries, or narrations include story elements identified from the information received in step 713. (For example, where the storyteller is telling a story about a penguin, a narration provided as guidance information may include a story scene involving the penguin.) In an embodiment of step 743, where the level of assistance is determined to be high (or correspond to the storyteller needing a greater level of assistance), the set of guidance information may comprise a greater amount of information to be provided to the storyteller and/or information that is to be provided more frequently. For example, in one case, a complete story narration may be provided to a storyteller where the associated level of assistance is determined to be high. In some cases, where the level of assistance is determined to be low, indicating that the storyteller does not need much assistance, then the set of guidance information may be smaller or may comprise only suggestions or limited queries.

At step 753, the set of guidance information is provided to the storyteller. In an embodiment, the set of guidance information is provided as the storyteller tells the story and may be provided via a user interface, such as user interface 155. One embodiment of method 703 further comprises determining the storyteller's response to the set of guidance information provided in step 753 and, based on the determined response, modifying story content presented as the storyteller tells the story. In one embodiment, one or more story elements presented as story content using a presentation component 130 may be modified based on the storyteller's response to guidance information provided in step 753. For example, wherein the guidance information presented in step 753 queries the storyteller to choose a setting for a story or scene in the story, based on the storyteller's response, story content corresponding to the storyteller's response (e.g., the setting) may be presented.

Figure 7D:
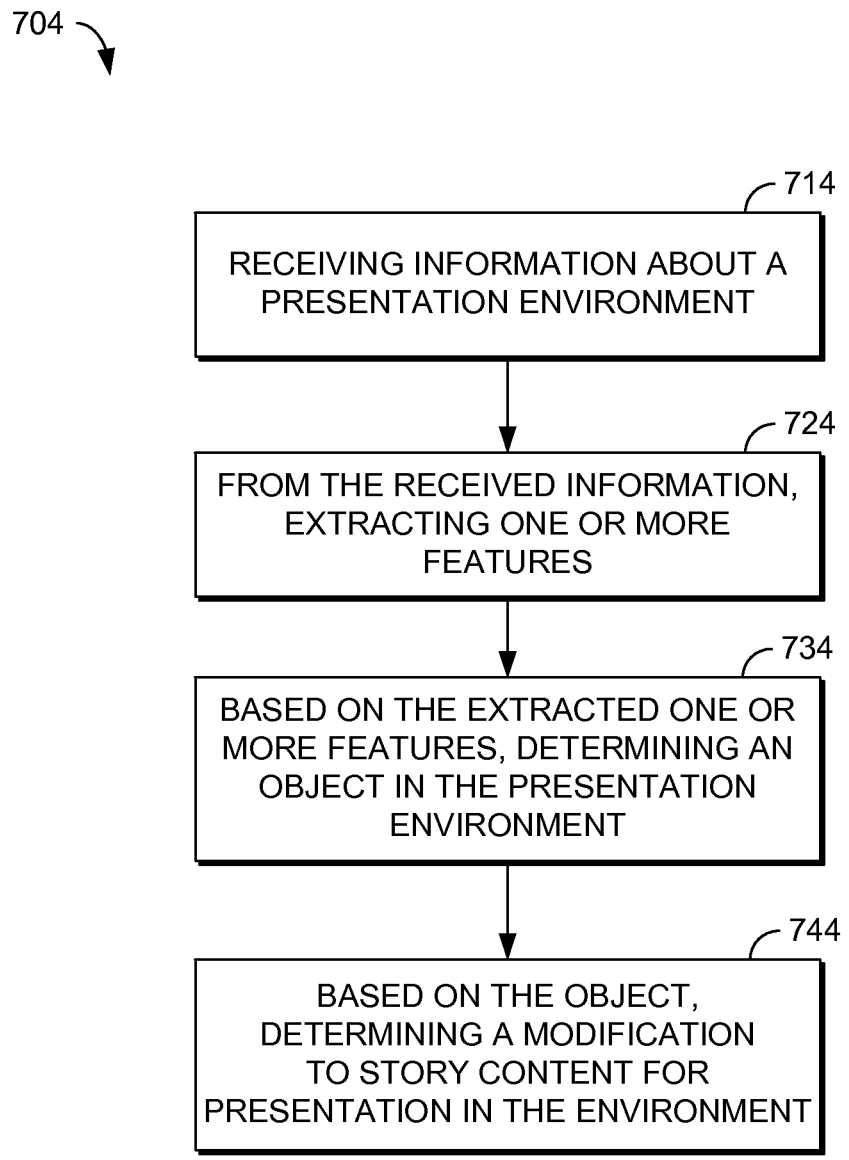
FIG. 7D depicts a flow diagram of a method for determining a presentation environmental model and modifying story content based on the model, in accordance with an embodiment of the invention.

Turning now to FIG. 7D, a flow diagram is provided of a method for determining a presentation environmental model and modifying story content based on the model, and is referred to generally as method 704. At step 714, information about a presentation environment is received. In an embodiment, information is received from one or more sensor(s), such as described in connection to sensor(s) 145 and environmental model generator 140. In an embodiment, the information received in step 714 comprises visual information of a known pattern projected onto the presentation environment.

At step 724, from the information received in step 714, one or more features are extracted. One embodiment of step 724 applies image processing techniques (such as image feature extraction) to extract one or more features. At step 734, based on the one or more features, an object in the presentation environment is determined. In one embodiment, step 734 comprises pattern recognition image processing of the one or more features to classify the features as an object. Examples of objects might include windows, doorways, furniture, toys, or aspects of actual objects, such as surfaces. (For example, one embodiment of step 734 may determine a surface object corresponding to the surface of a dresser, although the dresser itself is not recognized or classified.) In one embodiment, the determined object is classified, and in one embodiment, the classification includes labeling or tagging the object in an environmental model. In one embodiment, information about the object and/or its label are stored in an environmental model corresponding to the presentation environment.

At step 744, based on the object determined in step 734, a modification is determined to story content to be presented in the environment. In one embodiment, the position of the story content, when it is projected in the environment, is determined based on the object. In one embodiment, the story content is modified such that the object is incorporated into the story. For example, wherein the object is determined to be a doorway, story content corresponding to a character entering or exiting a scene in the story may be modified so as to present the character (story content) as entering or exiting from the actual doorway object.

Figure 7E:
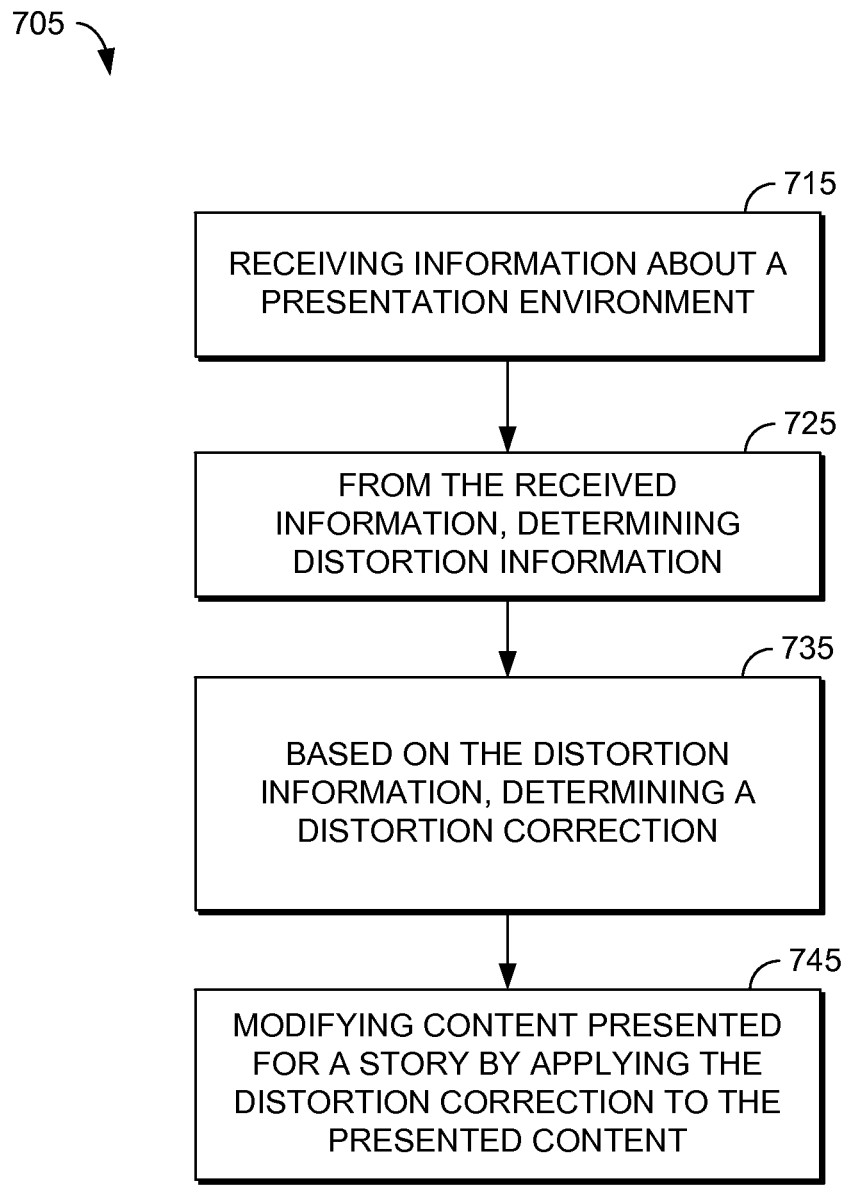
FIG. 7E depicts a flow diagram of a method for determining a presentation environmental model for modifying image information projected in a presentation environment, in accordance with an embodiment of the invention.

Turning now to FIG. 7E, a flow diagram is provided of a method for determining a presentation environmental model for modifying image information projected in a presentation environment, and is referred to generally as method 705. At step 715, information about a presentation environment is received. In an embodiment, information is received from one or more sensor(s), such as described in connection to sensor(s) 145 and environmental model generator 140. In an embodiment, the information received in step 715 comprises visual information of a known pattern projected onto a presentation environment, such as described in connection to FIG. 4B.

At step 725, based on the information received in step 715, distortion information is determined. In one embodiment, distortion information or a degree of distortion may be determined based on determining a difference in received information as compared to the known pattern. For example, wherein the known pattern comprises a uniform grid, differences in the received projected image of the known pattern, and specifically the grid spacing or broken lines in the grid, indicate distortion, which may be introduced by the presentation environment. An embodiment of step 725 comprises determining the distortion information, which may be determined as the difference from this comparison, as determined at various positions in the projected pattern.

At step 735, based on the distortion information, a distortion correction is determined. In one embodiment, step 735 determines a distortion correction to minimize the distortion determined in step 725. For example, in one embodiment, the pattern projected in the presentation environment is modified until the visual information received of the projected pattern matches the known pattern (prior to modification). This modification comprises the distortion correction. In one embodiment, a distortion correction is determined based on the distortion information determined in step 725 to minimize the distortion information (minimize the difference between the known pattern and received visual information of a known pattern projected onto the presentation environment). In an embodiment, the distortion correction is stored as an environmental model of the presentation environment.

At step 745, story content presented in the presentation environment (or story content for presentation) is modified based on the distortion correction determined in step 735. For example, the story content may be modified by applying the distortion correction to the story content. In an embodiment, method 705 is carried out using projection distortion correction component 135, such as described in connection to FIG. 1B.

Accordingly, we have described various aspects of technology directed to systems and methods for providing an immersive, dynamic storytelling experience that may be tailored to a user. We have described embodiments of a storytelling engine for assembling and presenting stories, embodiments of a story guide for providing guidance to a storyteller, embodiments for determining a model of the presentation environment, which may be used to modify a presentation based on the model (such as incorporating actual objects into a story), and embodiments of a content authoring and production system for generating story structures and corresponding story content used by a storytelling platform to provide the immersive, dynamic story experience.

It is understood that various features, sub-combinations, and modifications of the embodiments described herein are of utility and may be employed in other embodiments without reference to other features or sub-combinations. Moreover, the order and sequences of steps shown in the example methods 701, 702, 703, 704, and 705 are not meant to limit the scope of the present invention in any way, and in fact, the steps may occur in a variety of different sequences within embodiments hereof. Such variations and combinations thereof are also contemplated to be within the scope of embodiments of the invention.

Having described various embodiments of the invention, an exemplary computing environment suitable for implementing embodiments of the invention is now described. With reference to FIG. 9, an exemplary computing device is provided and referred to generally as computing device 900. The computing device 900 is but one example of a suitable computing environment and is not intended to suggest any limitation as to the scope of use or functionality of the invention. Neither should the computing device 900 be interpreted as having any dependency or requirement relating to any one or combination of components illustrated.

Embodiments of the invention may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the invention may be practiced in a variety of system configurations, including handheld devices, consumer electronics, general-purpose computers, more specialty computing devices, etc. Embodiments of the invention may also be practiced in distributed computing environments where tasks are performed by remote-processing devices that are linked through a communications network. In a distributed computing environment, program modules may be located in both local and remote computer storage media including memory storage devices.

With reference to FIG. 9, computing device 900 includes a bus 910 that directly or indirectly couples the following devices: memory 912, one or more processors 914, one or more presentation components 916, one or more input/output (I/O) ports 918, one or more I/O components 920, and an illustrative power supply 922. Bus 910 represents what may be one or more busses (such as an address bus, data bus, or combination thereof). Although the various blocks of FIG. 9 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 9 is merely illustrative of an exemplary computing device that can be used in connection with one or more embodiments of the present invention. (For example, presentation component 916 may be embodied as presentation component 130 and/or may be used as part of user interface 155 of FIG. 1A.) Distinction is not made between such categories as "workstation," "server," "laptop," "handheld device," etc., as all are contemplated within the scope of FIG. 9 and with reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 900. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 912 includes computer storage media in the form of volatile and/or nonvolatile memory. The memory may be removable, non-removable, or a combination thereof. Exemplary hardware devices include solid-state memory, hard drives, optical-disc drives, etc. Computing device 900 includes one or more processors 714 that read data from various entities such as memory 912 or I/O components 920. Presentation component(s) 916 presents data indications to a user or other device. Exemplary presentation components include a display device, including a projector, speaker, printing component, vibrating component, presentation component 130, user interface 155 of FIG. 1A, and/or the like.

The I/O ports 918 allow computing device 900 to be logically coupled to other devices, including I/O components 920, some of which may be built in. Illustrative components include a microphone, joystick, game pad, satellite dish, scanner, printer, wireless communication device, etc. The I/O components 920 may provide a natural user interface (NUI) that processes air gestures, voice, or other physiological inputs generated by a user, for example, a user touching, motioning towards, selecting, or pointing to content projected onto a surface in a presentation environment. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 900. The computing device 900 may be equipped with depth cameras, such as stereoscopic camera systems, acoustic, infrared camera systems, RGB camera systems, RF-interference detection, or the like, and/or a combination of these for gesture detection and recognition. Additionally, the computing device 900 may be equipped with (or operate in conjunction with) accelerometers or gyroscopes that enable detection of motion. The output of the accelerometers or gyroscopes may be provided to the display of the computing device 900 to render immersive augmented reality or virtual reality.

Many different arrangements of the various components depicted, as well as components not shown, are possible without departing from the scope of the claims below.

Embodiments of the present invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

Accordingly, in one aspect, an embodiment of the present disclosure is directed to a computerized method of providing a dynamic, immersive story experience. The method comprises receiving electronic story resources including (a) a story structure comprising a set of story blocks, each block having metadata and at least one placeholder, and (b) one or more corresponding story element libraries; receiving story presentation environment information and contextual information; based at least on a portion of the metadata and contextual information, determining a sequence of one or more story blocks from the set of story blocks; and determining, using the one or more corresponding story element libraries, a first story element for a first placeholder in a first story block, thereby populating the first story block with the first story element. The method further comprises generating electronic story-presentation instructions based on the sequence of one or more story blocks, the first story block populated with the first story element, and the received presentation environment information; and providing the electronic story-presentation instructions to a presentation device configured to present story content based on the instructions.

In some embodiments of the method, the presentation environment information comprises image information obtained from projecting a known pattern in the presentation environment, and the method further comprises determining distortion information based on a determined difference in the obtained image information compared to the known pattern; based on the distortion information, determining a distortion correction; and modifying story content for presentation in the environment based on the distortion correction.

In another aspect, computer-storage media is provided having computer-executable instructions embodied thereon that when executed determines a story structure for providing an immersive story experience. The story structure includes an arranged order of story blocks, each story block: (a) specifying a portion of a story and identifying story content corresponding to the portion of the story, (b) including metadata specifying information about the story block, and (c) including at least one placeholder for story content, the placeholder configured to be populated with story content at a story-assembly time or a story-presentation time. The story structure further includes logic for determining a sequence of blocks from the arranged order of story blocks, the sequence configured for use to assemble and present the story; and logic for determining story content for populating the at least one placeholder in each block.

In yet another aspect, an embodiment of the present disclosure is directed to a computerized method of providing a dynamic, immersive story experience. The method comprises receiving, using one or more presentation-environment sensors, information from a human storyteller; determining a first concept associated with the received information; determining, using a semantic knowledge representation system, a set of concepts related to the first concept; determining a set of story content corresponding to the set of related concepts, the set of story content determined based on a story library; and presenting the set of story content.

In some embodiments, the computerized method further comprises determining an analysis of the received information from the human storyteller; based on the analysis, determining a storytelling level of assistance associated with the human storyteller; based on the determined level of assistance, generating a set of guidance information; and providing the set of guidance information to a presentation device configured to present the guidance information to the storyteller.

In some embodiments, presenting the set of story content comprises providing electronic story-presentation instructions corresponding to the set of story content to a presentation device configured to present the set of story content based on the instructions. In some embodiments, the received information from the storyteller comprises information derived from speech, motion, gestures, or an indication of a book or toy.

Some embodiment of the computerized method further comprise receiving information about a presentation environment; from the received information, extracting one or more features; and based on the extracted one or more features, determining an object in the presentation environment, wherein the set of story content is further determined based on the object in the presentation environment.

In still another aspect, a method is provided for determining a presentation environmental model and modifying story content based on the model. The method comprises receiving information about a presentation environment; from the received information, extracting one or more features; based on the extracted one or more features, determining an object in the presentation environment; and based on the object, determining a modification to story content for presentation in the environment.

In still another aspect, a method is provided for providing story guidance to a storyteller. The method comprises receiving information from a storyteller; determining an analysis of the received information; based on the analysis, determining a storytelling level of assistance associated with the storyteller; based on the level of assistance, determining a set of guidance information; and providing the set of guidance information to the storyteller.

In still another aspect, a method is provided for determining a presentation environmental model for modifying image information projected in a presentation environment. The method comprises receiving information about a presentation environment comprising image information obtained from projecting a known pattern in a presentation environment; from the received information, determining distortion information based on a determined difference in the received information compared to the known pattern; based on the distortion information, determining a distortion correction; and modifying story content for presentation in the environment based on the distortion correction.

The invention claimed is:

1. A computerized method for providing a dynamic, immersive story experience, the method comprising: receiving electronic story resources including (a) an unassembled plurality of story blocks, each story block of the plurality of story blocks having metadata specifying input data and output data for the story block, and a set of placeholders, and (b) a set of story element libraries; receiving a first set of data comprising physical information about a story presentation environment and contextual information; based at least on a portion of the metadata and the received contextual information, assembling a sequence of two or more story blocks from the unassembled plurality of story blocks into a story structure, the story structure linking the sequence of a first story block and a second story block by connecting the output data of a first story block to the input data of a second story block; automatically populating a first placeholder of the first story block with a character from the set of story element libraries based on the first story block's input data metadata; generating electronic story-presentation instructions based on the story structure and the received physical information about the story presentation environment information;

and providing the electronic story-presentation instructions to a presentation device configured to present story content based on the instructions, receiving, during presentation of the first story block, a second set of data comprising physical information about a story presentation environment and contextual information; responsive to receipt of the second set of data and during presentation of the first story block: selecting a third story block from the unassembled set of story blocks, modifying the story structure by unlinking the first story block from the second story block and linking the output data of the first story block to input data of the third story block, and updating the presentation device with the electronic story-presentation instructions including the modified story structure, wherein the physical information about the story presentation environment comprises image information obtained by capturing a projected known pattern into the presentation environment, and wherein the computerized-method further comprises: generating distortion information based on a determined difference in the obtained image information compared to the known pattern; based on the distortion information, determining a distortion correction; and modifying story content for presentation in the environment based on the distortion correction.

2. The computerized method of claim 1, wherein the physical information about the story presentation environment information comprises input from a human user located in the presentation environment.

3. The computerized method of claim 2, wherein the input comprises speech, gestures, or motion by the human user.

4. The computerized method of claim 1, wherein the first story element comprises at least one of a story character, setting, sound effect, visual image, animation, video, or story logic.

5. The computerized method of claim 1, wherein the contextual information comprises at least one of the time of day, day of week, age level of a user located in the presentation environment, bed time of a user located in the presentation environment, or emotional-energy level of speech by a storyteller in the presentation environment.

6. The computerized method of claim 1, wherein the electronic story-presentation instructions include story-duration information, and wherein the story duration information is based on the contextual information.

7. The computerized method of claim 1, wherein the electronic story-presentation instructions include instructions for presenting story prompts using the presentation device, the story prompts corresponding to the sequence of the one or more story blocks.

8. The computerized method of claim 1, further comprising:
receiving, during presentation of the story content, a third set of data comprising physical information about a story presentation environment and contextual information;
responsive to receipt of the second set of data and during presentation of the story content:
selecting the second story block from the unassembled set of story blocks,
updating the story structure by linking the output data of the third story block to the input data of the second story block, and
providing the presentation device with the electronic story-presentation instructions including the updated story structure.

9. One or more computer storage media having computer-executable instructions embodied thereon that, when executed by one or more computing devices, generates a story structure for providing an immersive story experience, the story structure comprising: a plurality of story blocks, each story block: (1) specifying a portion of a story and identifying story content compatible with the specified portion of the story, (2) including metadata specifying input data and output data for the story block, and (3) including at least one placeholder for story content, the placeholder configured to be populated with story content at a story-assembly time or a story-presentation time; logic for assembling a sequence of two or more story blocks from the plurality of story blocks into the story structure by linking the sequence of a first story block and a second story block by connecting the output data of a first story block to the input data of a second story block; a set of guidance information associated with the assembled sequence of story blocks: logic for populating at least one placeholder of the first story block with compatible story content; logic for generating a subset of the set of guidance information for providing to a human storyteller; logic for generating story-presentation instructions based on the assembled and populated sequence of two or more story blocks, logic for modifying the story structure during presentation of the first story block of the story structure facilitated by the story-presentation instructions, the modifying including unlinking the first story block from the second story block and linking the output data of the first story block to input data of a third story block in response to receipt of physical information about a story presentation environment and contextual information; and logic for updating the story-presentation instructions based on the modified story structure, wherein the physical information about the story presentation environment comprises image information obtained by capturing a projected known pattern into the presentation environment, and wherein the computerized-method further comprises: generating distortion information based on a determined difference in the obtained image information compared to the known pattern; based on the distortion information, determining a distortion correction; and modifying story content for presentation in the environment based on the distortion correction.

10. The media of claim 9, wherein the story structure further comprises one or more story content libraries used for obtaining the story content for populating the at least one placeholder in each block.

11. The media of claim 9, wherein the story structure is generated using a software application and the story structure is packaged with the story content.

12. The media of claim 9, wherein each story block further specifies a story-transition from a previous story block or a subsequent story block in the arranged order of story blocks.

13. A computerized method for providing an immersive story experience, the method comprising: receiving, using one or more presentation-environment sensors, information from a human storyteller; determining a first concept associated with the received information; generating, using a semantic knowledge representation system, a set of concepts related to the first concept; generating a set of story content corresponding to the set of related concepts, the set of story content determined based on a story library; collecting a set of story blocks from an unassembled plurality of story blocks, each story block having a set of placeholders; generating a story structure from the collected set of story blocks by assembling a sequence of the collected set of story blocks;
populating a generated story structure with the set of story content the story structure comprising a set of story blocks wherein a first story block is at least temporary linked to a second story block via metadata specifying output data associated with the first block to metadata specifying input data associated with the second story block; presenting the story structure populated with the set of story content, identifying a second set of concepts based on additional information received from the human storyteller during presentation of the story structure corresponding to the first story block;
responsive to identification of the second set of concepts, selecting a third story block from the unassembled set of story blocks, and modifying the story structure by unlinking the first story block from the second story block and linking the output data of the first story block to input data of the third story block during presentation of the story structure corresponding to the first story block, wherein the information about a presentation environment received by the presentation-environment sensors comprises image information obtained by capturing a projected known pattern into the presentation environment, and wherein the computerized-method further comprises: generating distortion information based on a determined difference in the obtained image information compared to the known pattern; based on the distortion information, determining a distortion correction; and modifying story content for presentation in the environment based on the distortion correction.

14. The computerized-method of claim 13, wherein presenting the set of story content comprises providing electronic story-presentation instructions corresponding to the set of story content to a presentation device configured to present the set of story content based on the instructions.

15. The computerized-method of claim 13, further comprising: determining an analysis of the received information from the human storyteller;
based on the analysis, determining a storytelling level of assistance associated with the human storyteller;
based on the determined level of assistance, generating a set of guidance information; and providing the set of guidance information to a presentation device configured to present the guidance information to the storyteller.

16. The computerized-method of claim 13, further comprising:
receiving information about a presentation environment;
from the received information, extracting one or more features; and
based on the extracted one or more features, determining an object in the presentation environment;
wherein the set of story content is further determined based on the object in the presentation environment.

17. The computerized-method of claim 13, wherein the received information from the storyteller comprises information derived from speech, motion, gestures, or an indication of a book or toy.

18. The computerized method of claim 13, further comprising:
receiving, using the one or more presentation-environment sensors, contextual information;
wherein the set of story content is further determined based on the received contextual information; and
wherein the received contextual information comprises at least one of the time of day, day of week, or an emotional-energy level of speech by the human storyteller.

* * * * *

UNITED STATES PATENT AND TRADEMARK OFFICE
CERTIFICATE OF CORRECTION

| | |
|---|---|
| PATENT NO. | : 11,250,630 B2 |
| APPLICATION NO. | : 14/942815 |
| DATED | : February 15, 2022 |
| INVENTOR(S) | : Randy S. Knipp et al. |

It is certified that error appears in the above-identified patent and that said Letters Patent is hereby corrected as shown below:

In the Specification

Column 2, Line 17, Delete "https://dspace. mit.edu/" and insert --https://dspace.mit.edu/--.

Column 6, Line 26, Delete "FIG." and insert --FIGS.--.

Column 15, Line 13, Delete "lease" and insert --least--.

Column 16, Line 4, Delete "processer" and insert --processor--.

Column 30, Line 2, Delete "which may much" and insert --which may be much--.

Column 38, Line 35, Delete "story-presentation" and insert --story presentation--.

In the Claims

Claim 1, Column 40, Line 20, The line reading "metadata; generating electronic story-presentation instruc-" should read --metadata; generating electronic story presentation instruc- --.

Claim 1, Column 40, Line 26, The line reading "story content based on the instructions, receiving, dur-" should read --story content based on the instructions; receiving, dur- --.

Claim 6, Column 40, Line 67, The line reading "electronic story-presentation instructions include story-du-" should read --electronic story-presentation instructions include story du- --.

Claim 9, Column 41, Line 61, The line reading "ment, and wherein the computerized-method further com-" should read --ment, and wherein the computerized method further com- --.

Signed and Sealed this
Sixth Day of September, 2022

Katherine Kelly Vidal
*Director of the United States Patent and Trademark Office*

CERTIFICATE OF CORRECTION (continued)
U.S. Pat. No. 11,250,630 B2

Claim 9, Column 41, Line 48, The line reading "lated sequence of two or more story blocks, logic for" should read --lated sequence of two or more story blocks; logic for--.

Claim 13, Column 42, Line 33, The line reading "set of story content, identifying a second set of concepts" should read --set of story content; identifying a second set of concepts--.

Claim 13, Column 42, Line 39, The line reading "of story blocks, and modifying the story structure by" should read --of story blocks; and modifying the story structure by--.

Claim 13, Column 42, Line 45, The line reading "environment received by the presentation-environment" should read --environment received by the presentation environment--.

Claim 14, Column 42, Line 56, The line reading "The computerized-method of claim 13, wherein pre-" should read --The computerized method of claim 13, wherein pre- --.

Claim 15, Column 42, Line 61, The line reading "The computerized-method of claim 13, further com-" should read --The computerized method of claim 13, further com- --.

Claim 16, Column 43, Line 4, The line reading "The computerized-method of claim 13, further com-" should read --The computerized method of claim 13, further com- --.